US012355546B2

(12) United States Patent
Guiney, Jr. et al.

(10) Patent No.: US 12,355,546 B2
(45) Date of Patent: Jul. 8, 2025

(54) SYSTEMS AND METHODS FOR AUTOMATED PRIORITIZATION OF SATELLITE ACTIVITIES

(71) Applicant: Network Access Associates Limited, London (GB)

(72) Inventors: John T. Guiney, Jr., Chandler, AZ (US); Christopher Winkelmann, Reston, VA (US); Peter Papadopoulos, Washington, DC (US); Kent Mitterer, McLean, VA (US); Hank Tseu, Ellicott City, MD (US)

(73) Assignee: Network Access Associates Limited, London (GB)

( * ) Notice: Subject to any disclaimer, the term of this patent is extended or adjusted under 35 U.S.C. 154(b) by 339 days.

(21) Appl. No.: 18/152,413

(22) Filed: Jan. 10, 2023

(65) Prior Publication Data

US 2024/0267117 A1 Aug. 8, 2024

Related U.S. Application Data

(63) Continuation of application No. 18/152,273, filed on Jan. 10, 2023.

(51) Int. Cl.
*H04B 7/185* (2006.01)
*H04W 72/56* (2023.01)

(52) U.S. Cl.
CPC ..... *H04B 7/18539* (2013.01); *H04B 7/18519* (2013.01); *H04B 7/18558* (2013.01); *H04W 72/56* (2023.01)

(58) Field of Classification Search
CPC ............ H04B 7/18539; H04B 7/18519; H04B 7/18558; H04B 7/18513; H04W 72/56
See application file for complete search history.

(56) References Cited

U.S. PATENT DOCUMENTS

2021/0328660 A1\* 10/2021 Schloemer ......... H04B 7/18519

FOREIGN PATENT DOCUMENTS

CN 115276758 A \* 11/2022

OTHER PUBLICATIONS

English translation of CN-115276758-A (Year: 2022).\*

\* cited by examiner

*Primary Examiner* — Shon G Foley
(74) *Attorney, Agent, or Firm* — Greenberg Traurig, LLP

(57) ABSTRACT

Systems and methods of the present disclosure may use a satellite operations center (SOC) to access an activity queue of satellite activity tasks in an activity buffer, each satellite activity task being associated with at least one satellite in a fleet. The SOC may determine mission critical variables associated with each satellite activity task based on space environment context data, satellite telemetry data, the position of each satellite, and the trajectory of each satellite. The SOC may determine, for each satellite activity task, using at least one statistical model, a prioritization tier based on the mission critical variables of each satellite activity task, and determine a satellite activity order defining an order of the satellite activity tasks based on the prioritization tier of each satellite activity task. The SOC may modify the activity buffer to order the satellite activity tasks in the activity queue according to the satellite activity order.

20 Claims, 25 Drawing Sheets

| CURRENT SHIFT | ‹ › |
|---|---|
| Username | Role |
| ⊙akam | MissionAnalyst |
| ⊙clam | Operator |
| ⊙dkroboth | SpacecraftEngi |
| ⊙jchavez | Planner |
| ⊙jrobinson | Operator |
| ⊙mregan | SpacecraftEngi |
| ⊙mtan | SiteReliabilityE |
| ⊙nhamet | Operator, Deput... |
| ⊙pjameson | Developer |
| ⊙rrobinson | SiteReliabilityE |
| ⊙viviatury | MissionDirector |

SEVERITY CIRCLE

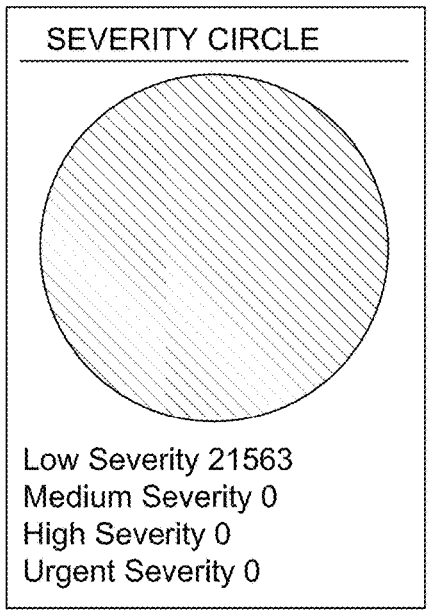

Low Severity 21563
Medium Severity 0
High Severity 0
Urgent Severity 0

Ⓐ

TICKETS ▼

21562 OPEN 

21558 UNACK 

⚡ OPEN (21562)

| Key ▼ | Description ▼ |
|---|---|
| MME-5928 | Failed to find a usable hardware address |
| CCE-2024 | [CMA144] Can not connect to Multiplexer |
| CCE-2025 | [AUT004] #CCE SCRLD0O0;0-Late AOS |
| CCE-2026 | [TPT016] Dop on TM link of connection |
| CCE-2027 | [CMA144] Can not connect to Multiplexer |
| CCE-2028 | [CMA144] Can not connect to Multiplexer |
| MME-5929 | Could not process new issue message |
| MME-5930 | Failed to find a usable hardware address |
| MME-5931 | Could not process new issue message |
| ECE-511 | async receive failed: End of file |
| ECE-512 | async receive failed: End of file |
| ECE-513 | async receive failed: End of file |
| CCE-2029 | [TPT016] Dop on TM link of connection |
| MME-5932 | Failed to find a usable hardware address |
| CCE-2030 | [CMA144] Can not connect to Multiplexer |
| CCE-2031 | [CMA144] Can not connect to Multiplexer |
| CCE-2032 | [CMA144] Can not connect to Multiplexer |
| CCE-2033 | [AUT004] #CCE_SCR.0000,0-Missed |
| MME-5933 | Failed to find a usable hardware address |

ANOMALY REPORTS ▼                                    HTSEU : AWAY ▼

| | MME-5927<br>HIGHEST SEVERITY<br>1 | MME-5927<br>OLDEST TICKET<br>11D 22H 3M |

| | Vehicle ▼ | Date ▼ | Severity ▼ | Ack ▼ |
|---|---|---|---|---|
| from the network ... | | 230/2017/-AUG-18 11:10:04 | 1 | |
| 'PRIME' | OW10 | 230/2017/-AUG-18 11:13:15 | 1 | ⚠ |
| detected [activity/sy... | OW03 | 230/2017/-AUG-18 11:13:19 | 1 | |
| CONNI of resource TM... | OW03 | 230/2017/-AUG-18 11:13:35 | 1 | |
| 'PRIME' | OW09 | 230/2017/-AUG-18 11:14:19 | 1 | ⚠ |
| 'PRIME' | OW09 | 230/2017/-AUG-18 11:14:19 | 1 | ⚠ |
| | | 230/2017/-AUG-18 11:15:00 | 1 | ⚠ |
| from the network ... | | 230/2017/-AUG-18 11:15:04 | 1 | ⚠ |
| | | 230/2017/-AUG-18 11:15:00 | 1 | ⚠ |
| | SL0008 | 230/2017/-AUG-18 11:16:27 | 1 | ⚠ |
| | SL0008 | 230/2017/-AUG-18 11:16:27 | 1 | ⚠ |
| | SL0008 | 230/2017/-AUG-18 11:16:27 | 1 | ⚠ |
| CONNI of resource TM... | OW03 | 230/2017/-AUG-18 11:17:14 | 1 | ⚠ |
| from the network ... | | 230/2017/-AUG-18 11:17:15 | 1 | ⚠ |
| 'PRIME' | OW10 | 230/2017/-AUG-18 11:18:15 | 1 | ⚠ |
| 'PRIME' | OW09 | 230/2017/-AUG-18 11:19:19 | 1 | ⚠ |
| 'PRIME' | OW09 | 230/2017/-AUG-18 11:19:19 | 1 | ⚠ |
| pass detected [octivity... | OW03 | 230/2017/-AUG-18 11:22:06 | 1 | ⚠ |
| from the network ... | | 230/2017/-AUG-18 11:22:54 | 1 | ⚠ |

Mike Thompson
Mission Director 

GROUP TICKETS    CREATE A TICKET

HIGHEST AVG. SEVERITY: FLYPAN EXEC.

| 30 | 2 | 5 |
|---|---|---|
| LEVEL 2 | LEVEL 3 | LEVEL 4 |

| | IN PROGRESS (2) | DONE (0) |
|---|---|---|

| SUMMARY ▼ | SEVERITY ▼ | ASSIGNEE ▼ |
|---|---|---|
| TCP/IP drop to Autofly | 80 | H Tseu |
| FEP Failure | 76 | N Hamet |

LEVEL 3:3      LEVEL 4:2

| SUMMARY ▼ | STATUS ▼ | SEVERITY ▼ | ASSIGNEE ▼ |
|---|---|---|---|
| Recycle Mod on Modem | OPEN | 80 | H Tseu |
| FEP Failure | OPEN | 76 | N Hamet |

| SUMMARY ▼ | STATUS ▼ | SEVERITY ▼ | ASSIGNEE ▼ |
|---|---|---|---|
| Missed Pass | OPEN | 80 | V Inatury |
| FEP Failure | OPEN | 76 | N Hamet |

FIG. 10 (Continued)

SYSTEMS AND METHODS FOR AUTOMATED PRIORITIZATION OF SATELLITE ACTIVITIES

CROSS-REFERENCE TO RELATED APPLICATIONS

This application claims priority to U.S. application Ser. No. 18/152,273 filed on 10 Jan. 2023 and entitled "SYSTEMS AND METHODS FOR SCALABLE AND AUTOMATED SATELLITE FLEET TASKING AND CONTROL," and is herein incorporated by reference in its entirety.

FIELD OF TECHNOLOGY

The present disclosure generally relates to computer-based platforms and/or systems configured for scalable and automated satellite fleet tasking and control, including virtualized fleet operation ground segment and automated and efficient orchestration thereof.

BACKGROUND OF TECHNOLOGY

A ground segment typically includes the ground-based elements of a spacecraft system used by operators and support personnel, as opposed to the space segment and user segment. The ground segment enables management of a spacecraft, and distribution of payload data and telemetry among interested parties on the ground. A ground segment may include one or more of ground (or Earth) stations, which provide radio interfaces with spacecraft, mission control (or operations) centers, from which spacecraft are managed, ground networks, which connect the other ground elements to one another, remote terminals, used by support personnel, spacecraft integration and test facilities, and launch facilities. The ground segment is typically designed for one-to-one satellite control, with one operator monitoring and manually issuing commands to one satellite.

SUMMARY OF DESCRIBED SUBJECT MATTER

In some aspects, the techniques described herein relate to a method including: accessing, by a satellite operations center (SOC) in a fleet operations ground segment, an activity queue of a plurality of satellite activity tasks in an activity buffer of the SOC; wherein the activity queue includes an order of issuing the satellite activity tasks; wherein each satellite activity task is associated with at least one satellite command based at least in part on: space environment context data indicative of conditions of a space environment in which a plurality of satellites in a constellation of satellites operate, and satellite telemetry data representative of satellite telemetry received from the plurality of satellites; accessing, by the SOC, satellite orbital data for the fleet of satellites; wherein the satellite orbital data includes: a position of each satellite, and a trajectory of each satellite; determining, by the SOC, a contact window associated with each satellite of the plurality of satellites based at least in part on the satellite orbital data; wherein the at least one contact window defines at least one period of time during which each satellite of the plurality of satellites has line-of-sight with at least one satellite communication infrastructure associated with the SOC; determining, by the SOC, a plurality of mission critical variables associated with each satellite activity task of the plurality of satellite activity tasks based at least in part on the space environment context data, the satellite telemetry data, the position of each satellite, and the trajectory of each satellite; wherein the plurality of mission critical variables includes: a state of health of each satellite, an age of each satellite activity task of the plurality of satellite activity tasks, and a service impact associated with each satellite activity task of the plurality of satellite activity tasks; determining, by the SOC for each satellite activity task, using at least one statistical model, a prioritization tier from a set of prioritization tier based at least in part on the plurality of mission critical variables associated with each satellite activity task; determining, by the SOC, a satellite activity order defining an order of plurality of satellite activity tasks based at least in part on: the contact window of each satellite, and the prioritization tier of each satellite activity task; modifying, by the SOC, the activity buffer to order the plurality of satellite activity tasks in the activity queue according to the satellite activity order.

In some aspects, the techniques described herein relate to a method, further including: positioning, by the SOC, at least one high prioritization satellite activity task having a high prioritization tier of the set of prioritization tiers to a top position in the satellite activity order; wherein the set of prioritization tiers includes a high prioritization tier, a standard prioritization tier and low prioritization tier; and positioning, by the SOC, at least one low prioritization satellite activity task having the low prioritization tier of the set of prioritization tiers to a bottom position in the satellite activity order.

In some aspects, the techniques described herein relate to a method, wherein the plurality of satellite activity tasks include a plurality of satellite anomaly tickets recording a plurality of satellite anomalies to be addressed by at least one operator.

In some aspects, the techniques described herein relate to a method, further including: instructing, upon the satellite anomaly ticket being in a first position in the ticket ordering, by the SOC, an interface management service to: access the activity buffer to obtain the satellite anomaly ticket, generate at least one user interface element with at least one content item populated by the satellite anomaly, space environment context data and satellite telemetry data of the satellite anomaly ticket, and render, on a display of a terminal associated an operator, the at least one user interface element so as to enable the operator to input user interactions to address the satellite anomaly ticket.

In some aspects, the techniques described herein relate to a method, further including: generating, by the SOC, at least one workflow to address the satellite anomaly ticket based at least in part on the user interactions; wherein the at least one workflow includes a series of tasks configured to trigger at least one fleet operations ground segment element of the fleet operations ground segment to generate at least one satellite command to the at least one satellite; and wherein the at least one satellite command to the at least one satellite is configured to cause at least one change in at least one of the satellite payload or the satellite bus to address the satellite anomaly.

In some aspects, the techniques described herein relate to a method, further including: dynamically instantiating, by the SOC, at least one element-specific container to instruct the at least one fleet operations ground segment element to perform the series of tasks so as to generate at least one satellite command to the at least one satellite.

In some aspects, the techniques described herein relate to a method, wherein the plurality of satellite activity tasks include a plurality of satellite commanding workflows includes a series of tasks configured to trigger at least one fleet operations ground segment element of the fleet operations ground segment to generate at least one satellite command to at least one satellite of the plurality of satellites.

In some aspects, the techniques described herein relate to a method, further including: automatically instructing, by the SOC, upon at least one contact window with the plurality of satellites commencing, the at least one satellite communication infrastructure to access each successive satellite commanding workflow in the activity queue according to the satellite activity order; and wherein each successive satellite commanding workflow is configured to cause the at least one satellite communication infrastructure to perform the series of tasks of each satellite commanding workflow so as to transmit the at least one satellite command to the at least one satellite during the at least one contact window.

In some aspects, the techniques described herein relate to a system including: a satellite operations center (SOC) in a fleet operations ground segment; wherein the SOC is configured to: access an activity queue of a plurality of satellite activity tasks in an activity buffer of the SOC; wherein the activity queue includes an order of issuing the satellite activity tasks; wherein each satellite activity task is associated with at least one satellite command based at least in part on: space environment context data indicative of conditions of a space environment in which a plurality of satellites in a constellation of satellites operate, and satellite telemetry data representative of satellite telemetry received from the plurality of satellites; access satellite orbital data for the fleet of satellites; wherein the satellite orbital data includes: a position of each satellite, and a trajectory of each satellite; determine a contact window associated with each satellite of the plurality of satellites based at least in part on the satellite orbital data; wherein the at least one contact window defines at least one period of time during which each satellite of the plurality of satellites has line-of-sight with at least one satellite communication infrastructure associated with the SOC; determine a plurality of mission critical variables associated with each satellite activity task of the plurality of satellite activity tasks based at least in part on the space environment context data, the satellite telemetry data, the position of each satellite, and the trajectory of each satellite; wherein the plurality of mission critical variables includes: a state of health of each satellite, an age of each satellite activity task of the plurality of satellite activity tasks, and a service impact associated with each satellite activity task of the plurality of satellite activity tasks; determine, for each satellite activity task, using at least one statistical model, a prioritization tier from a set of prioritization tier based at least in part on the plurality of mission critical variables associated with each satellite activity task; determine a satellite activity order defining an order of plurality of satellite activity tasks based at least in part on: the contact window of each satellite, and the prioritization tier of each satellite activity task; modify the activity buffer to order the plurality of satellite activity tasks in the activity queue according to the satellite activity order.

In some aspects, the techniques described herein relate to a system, wherein the SOC is further configured to: position at least one high prioritization satellite activity task having a high prioritization tier of the set of prioritization tiers to a top position in the satellite activity order; wherein the set of prioritization tiers includes a high prioritization tier, a standard prioritization tier and low prioritization tier; and position at least one low prioritization satellite activity task having the low prioritization tier of the set of prioritization tiers to a bottom position in the satellite activity order.

In some aspects, the techniques described herein relate to a system, wherein the plurality of satellite activity tasks include a plurality of satellite anomaly tickets recording a plurality of satellite anomalies to be addressed by at least one operator.

In some aspects, the techniques described herein relate to a system, wherein the SOC is further configured to: instructing, upon the satellite anomaly ticket being in a first position in the ticket ordering, an interface management service to: access the activity buffer to obtain the satellite anomaly ticket, generate at least one user interface element with at least one content item populated by the satellite anomaly, space environment context data and satellite telemetry data of the satellite anomaly ticket, and render, on a display of a terminal associated an operator, the at least one user interface element so as to enable the operator to input user interactions to address the satellite anomaly ticket.

In some aspects, the techniques described herein relate to a system, wherein the SOC is further configured to: generate at least one workflow to address the satellite anomaly ticket based at least in part on the user interactions; wherein the at least one workflow includes a series of tasks configured to trigger at least one fleet operations ground segment element of the fleet operations ground segment to generate at least one satellite command to the at least one satellite; and wherein the at least one satellite command to the at least one satellite is configured to cause at least one change in at least one of the satellite payload or the satellite bus to address the satellite anomaly.

In some aspects, the techniques described herein relate to a system, wherein the SOC is further configured to: dynamically instantiate at least one element-specific container to instruct the at least one fleet operations ground segment element to perform the series of tasks so as to generate at least one satellite command to the at least one satellite.

In some aspects, the techniques described herein relate to a system, wherein the plurality of satellite activity tasks include a plurality of satellite commanding workflows includes a series of tasks configured to trigger at least one fleet operations ground segment element of the fleet operations ground segment to generate at least one satellite command to at least one satellite of the plurality of satellites.

In some aspects, the techniques described herein relate to a system, wherein the SOC is further configured to: automatically instruct upon at least one contact window with the plurality of satellites commencing, the at least one satellite communication infrastructure to access each successive satellite commanding workflow in the activity queue according to the satellite activity order; and wherein each successive satellite commanding workflow is configured to cause the at least one satellite communication infrastructure to perform the series of tasks of each satellite commanding workflow so as to transmit the at least one satellite command to the at least one satellite during the at least one contact window.

In some aspects, the techniques described herein relate to a non-transitory computer readable medium having software instructions stored thereon, the software instructions, upon execution, being configured to cause a satellite operations center (SOC) in a fleet operations ground segment to perform steps including: accessing an activity queue of a plurality of satellite activity tasks in an activity buffer of the SOC; wherein the activity queue includes an order of issuing the satellite activity tasks; wherein each satellite activity task is associated with at least one satellite command based at least in part on: space environment context data indicative of conditions of a space environment in which a plurality of satellites in a constellation of satellites operate, and satellite telemetry data representative of satellite telemetry received from the plurality of satellites; accessing satellite orbital data for the fleet of satellites; wherein the satellite orbital data includes: a position of each satellite, and a trajectory of each satellite; determining a contact window associated with each satellite of the plurality of satellites based at least in part on the satellite orbital data; wherein the at least one contact window defines at least one period of time during which each satellite of the plurality of satellites has line-of-sight with at least one satellite communication infrastructure associated with the SOC; determining a plurality of mission critical variables associated with each satellite activity task of the plurality of satellite activity tasks based at least in part on the space environment context data, the satellite telemetry data, the position of each satellite, and the trajectory of each satellite; wherein the plurality of mission critical variables includes: a state of health of each satellite, an age of each satellite activity task of the plurality of satellite activity tasks, and a service impact associated with each satellite activity task of the plurality of satellite activity tasks; determining, for each satellite activity task, using at least one statistical model, a prioritization tier from a set of prioritization tier based at least in part on the plurality of mission critical variables associated with each satellite activity task; determining a satellite activity order defining an order of plurality of satellite activity tasks based at least in part on: the contact window of each satellite, and the prioritization tier of each satellite activity task; modifying the activity buffer to order the plurality of satellite activity tasks in the activity queue according to the satellite activity order.

In some aspects, the techniques described herein relate to a non-transitory computer readable medium, wherein the software instructions are further configured to cause the SOC to perform further steps including: positioning at least one high prioritization satellite activity task having a high prioritization tier of the set of prioritization tiers to a top position in the satellite activity order; wherein the set of prioritization tiers includes a high prioritization tier, a standard prioritization tier and low prioritization tier; and positioning at least one low prioritization satellite activity task having the low prioritization tier of the set of prioritization tiers to a bottom position in the satellite activity order.

In some aspects, the techniques described herein relate to a system, wherein the plurality of satellite activity tasks include a plurality of satellite anomaly tickets recording a plurality of satellite anomalies to be addressed by at least one operator.

In some aspects, the techniques described herein relate to a system, wherein the plurality of satellite activity tasks include a plurality of satellite commanding workflows includes a series of tasks configured to trigger at least one fleet operations ground segment element of the fleet operations ground segment to generate at least one satellite command to at least one satellite of the plurality of satellites.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 9 depicts an operator user interface for viewing and addressing tickets in accordance with one or more embodiments of the present disclosure.

FIG. 10 depicts a mission director (supervisory) user interface for viewing and managing tickets and data associated therewith in accordance with one or more embodiments of the present disclosure.

DETAILED DESCRIPTION

Various detailed embodiments of the present disclosure, taken in conjunction with the accompanying FIGS., are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 16 illustrate systems and methods of satellite constellation tasking and telemetry automation, scalable fleet operations management and configuration. The following embodiments provide technical solutions and technical improvements that overcome technical problems, drawbacks and/or deficiencies in technical fields involving ground systems for control of satellite operations and tracking, including unscalable and computationally inefficient use of infrastructural hardware and components. As explained in more detail, below, technical solutions and technical improvements herein include aspects of improved fleet operation scalability via virtualization of tasking, telemetry tracking, and workflow elements and components, and improved ground-based satellite communication based on dynamic and intelligent tasking and task scheduling. Based on such technical features, further technical benefits become available to users and operators of these systems and methods. Moreover, various practical applications of the disclosed technology are also described, which provide further practical benefits to users and operators that are also new and useful improvements in the art.

Figure 1A:
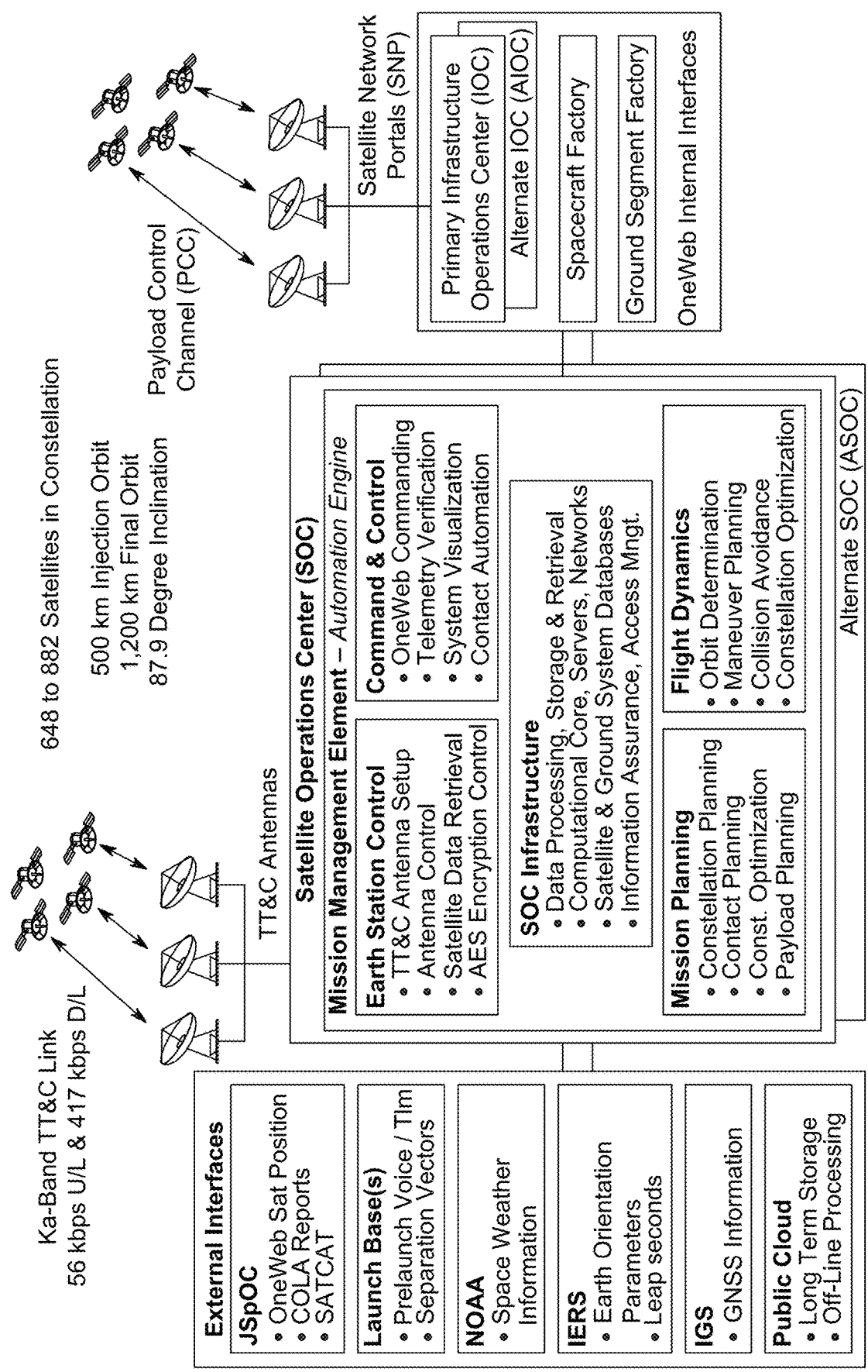
FIG. 1A and FIG. 1B depict a top-level Fleet Operation Ground Segment (FOGS) architecture in accordance with one or more embodiments of the present disclosure.
Figure 1B:
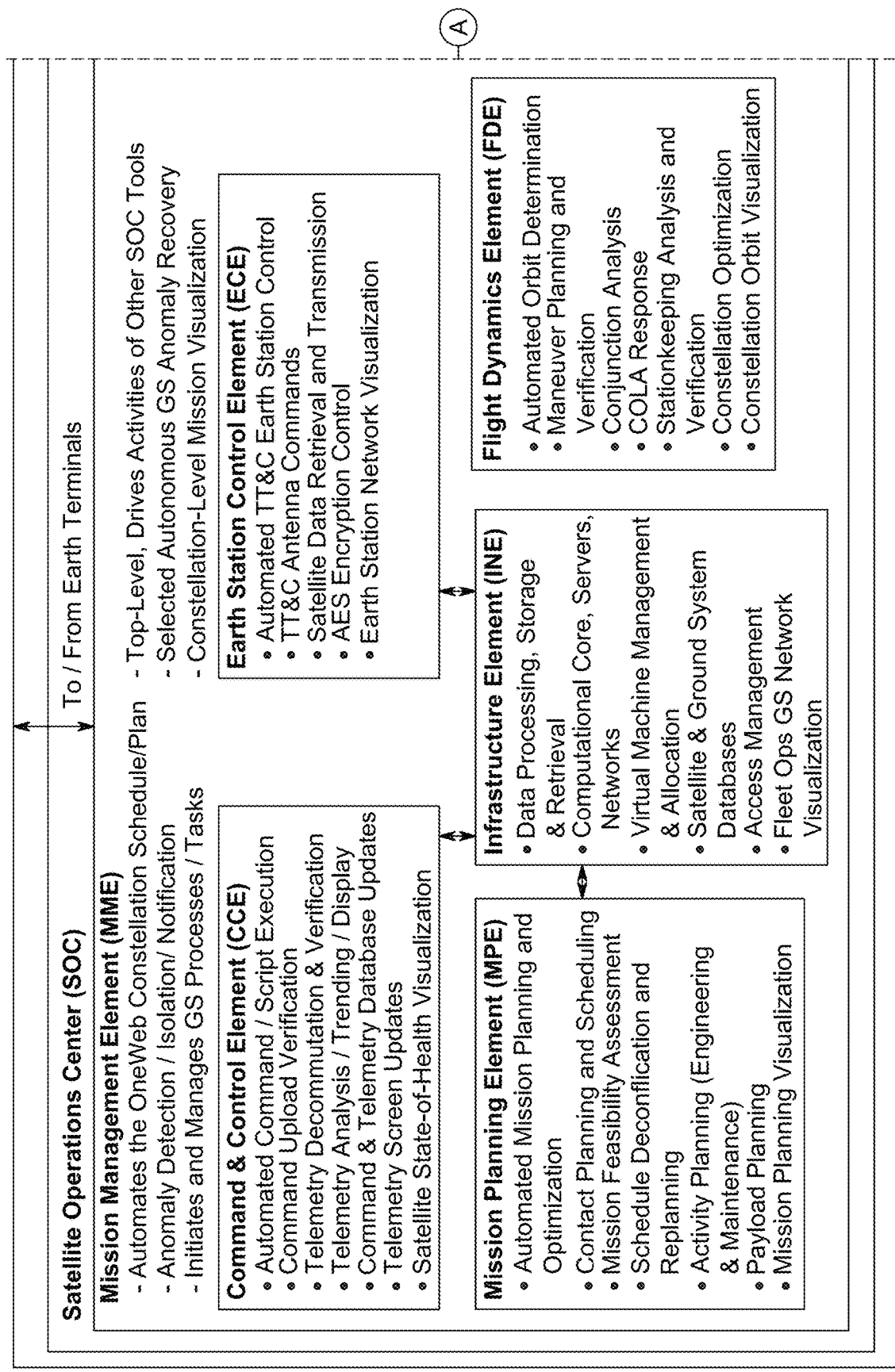

Referring to FIG. 1A and FIG. 1B, a top-level Fleet Operation Ground Segment (FOGS) architecture is depicted according to one or more embodiments of the present disclosure.

In some embodiments, the FOGS includes a multi-element system for real-time commanding and telemetry analysis to automate commanding and tasking of a satellite constellation. In some embodiments, the FOGS may utilize FOGS elements including a mission management element (MME), a command control element (CCE), an earth station control element (ECE), a mission planning element (MPE), a flight dynamics element (FDE), among other elements or any combination thereof to support all operational requirements of one or more satellite constellations.

Herein, the term "telemetry" refers to the in situ collection of measurements or other data by satellite payload and satellite bus and the automatic transmission to ground-based receiving equipment (e.g., antennas of the ECE) for monitoring and tracking. The telemetry may include measurements and system diagnostic data from sensors and components of the satellite payload and the satellite bus, including system logs, health and status data, sensor measurements, and other measurements or any combination thereof.

In some embodiments, the term "constellation" and the term "fleet" may be used interchangeably. A fleet may include one or more constellations, and a constellation may be formed from one or more fleets. Accordingly, both constellation and fleet are used herein to denote a multitude of satellites that may be in communication with the FOGS for tracking, telemetry and/or control.

In some embodiments, the term "element" or "computer element" identifies at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, each FOGS element may be architected with each other FOGS element to form a satellite operations center (SOC). The SOC is the combination of the FOGS elements to enable tracking, analysis and commanding/control of a fleet and/or constellation of satellites. Accordingly, the FOGS elements may include hardware and/or software configured to exchange data across internal and external interfaces for real-time commanding and telemetry analysis. As such, the SOC may include infrastructural components, including, e.g., data processing, storage and retrieval, computation core, servers, networks, satellite and ground system databases, information assurance, access management, virtual machine management and allocation, access management, fleet ops ground station network visualization, among other core services and infrastructure. In some embodiments, the SOC may be architected as a virtualized set of FOGS elements that can be scaled and orchestrated within one or more virtual environments. Accordingly, the FOGS elements can be instantiated and/or shut down on a dynamic basis and/or in multiple instances to create multiple SOCs. Additionally or alternatively, there may be multiple sets of hardware infrastructure to host multiple SOCs. As a result, whether multiple SOCs are instantiated within a given infrastructural environment (e.g., hardware and/or operating system/kernel/driver components), or multiple infrastructural environments each hosting one or more SOCs, operators may conduct operations from any SOC at any time software or hardware from any SOC may be used to operate the satellite fleet at any time.

In some embodiments, the MME operates over the infrastructure to orchestrate each other element. Accordingly, each element may be implemented on bare metal, in virtual machines, in containers, or any suitable combination thereof. In some embodiments, the term "container" refers to an entire runtime environment: an application, plus all its dependencies, libraries and other binaries, and configuration files needed to run the application, bundled into one package. By containerizing the application platform and its dependencies, differences in OS distributions and underlying infrastructure are abstracted away. In some embodiments, examples of container technology may include, e.g., Docker™, LXC, Podman, Solaris containers, Hyper-V, among others or any combination thereof. In some embodiments, other virtualization technologies may be employed, such as, e.g., virtual private servers, partitions, virtual environments, virtual kernels, jails, virtual machines, among others or any suitable combination thereof.

Accordingly, in some embodiments, the MME may orchestrate containerized job execution to provide all SOC orchestration and manage SOC automation, e.g., based on preconfigured and/or dynamically generated workflows. SOC jobs may include, e.g., anomaly detection/isolation/notification initiates and manages ground station processes/tasks top-level, drives activities of other SOC tools selected autonomous ground station anomaly recovery constellation-level mission visualization, among other jobs for command and control of each satellite of a constellation of satellites, or any combination thereof. As a result, each element the FOGS and/or each component of each element may be run in a discrete container over the core infrastructure and orchestrated by the MME enabling scalable one-to-many implementation of a set of core infrastructure for issuing commands and receiving telemetry from a fleet of satellites that would typically require greater infrastructure resources.

In some embodiments, virtualization and/or containerization of FOGS elements may be utilized to create the SOC rather than employ ground elements of a ground system installed and running continuously on bare metal, which may facilitate fast real-time communication with a particular satellite, but is restricted to operating only when the satellite is within contact. In some embodiments, to facilitate more efficient command and control of a large satellite fleet and/or constellation, the ground elements may be containerized so less infrastructure may be implemented in the ground system. Indeed, all satellites in a fleet are unlikely to be contact with the ground system at any given time. Thus, dedicated hardware for each software, as is typically used, results in much of the infrastructure going unutilized most of the time. Therefore, the MME may orchestrate the FOGS elements and the infrastructure to startup and shutdown satellite specific instances on-demand based on contact windows with the associated satellites.

In some embodiments, the SOC may include the ECE. The ECE performs monitoring, and control of telemetry, tracking and control (TT&C) antennas. In some embodiments, the TT&C antennas may include one or more antennas for communicating with the bus and/or payload of each satellite in the fleet of satellites.

In some embodiments, a satellite bus (or spacecraft bus) may include a main body and structural components of the satellite in which the payload and/or scientific instruments and are held. Bus-derived satellites may be customized to customer requirements, for example with specialized sensors or transponders, in order to achieve a specific mission. In some embodiments, the satellites in the fleet may be bus-derived or may be of a custom and/or specialized architecture.

In some embodiments, satellite payload may be defined as modules carried on satellites with the ability to perform certain functionalities. A satellite may include the payload and the bus. For example, microwave radio signals may serve as the backbone of communication between space systems and the TT&C antennas. Whether on an active or passive basis, radio signals also function as a remote sensing tool for scientific observation and environmental monitoring on space science and Earth observation missions. And space-based radio navigation signals returned back to Earth form the basis of satellite navigation systems.

In some embodiments, payloads may include not only the specific radio technologies and systems aboard a spacecraft tasked with delivering mission objectives, also including communicating with the supporting ground equipment and telecommunication systems through which spacecraft payloads are controlled and results are communicated to the FOGS. In some embodiments, examples of components that may form the payload of a given satellite may include the definition and design of scientific and remote sensing instruments operating on the radio spectrum up to microwave or millimeter-wave frequencies, dedicated communication payloads, such as those flown on telecommunication satellites, devices capable of transmitting, receiving or utilizing radio signals from current and future navigation systems (e.g., the current GPS and GLONASS satellite constellations, Europe's land-based EGNOS overlay signal and the Galileo satellite navigation system, among others), among other payload components or any suitable combination thereof.

In some embodiments, the ECE may control the TT&C antennas to communicate with the satellite bus and payload according to orchestration by the MME. In some embodiments, the control of the TT&C antennas may include, e.g., TT&C antenna setup, TT&C search station antenna control, satellite data retrieval, AES encryption control, earth station network visualization, among other earth state and TT&C tasks and monitoring based on communication with each satellite in the constellation.

In some embodiments, the TT&C antennas may be employed to communicate with each satellite in the constellation via dedicated TT&C Earth Station (ES) antennas used for communication while spacecraft payload is on or off. In some embodiments, additional communications may link through the Satellite Access Point (SAP) antennas to provide satellite commanding, such as trajectory commanding, telemetry monitoring, maneuver commanding (e.g., adjustments to attitude or other orientation maneuvering), upload software, download data, payload control commanding, e.g., to instruct the bus to power on or off one or more payload components, among other commanding or other data communication with the satellites or any combination thereof.

In some embodiments, the TT&C may include permanent infrastructure in a fixed location. As such, any given satellite may only be in contact with the TT&C antennas for a limited duration during a period of time. Accordingly, many TT&C sites may be built throughout the globe to maximize contact time with each satellite. However, to reduce costs and more efficiently use available communication infrastructure, some or all commanding and/or data communication may be performed via, e.g., a Payload Control Channel (PCC) of a network of satellite network portals (SNP), each SNP having one or more SAP antennas. In some embodiments, the SNP include a network of the SAP antennas configured to provide service to customers, such as, e.g., network access (e.g., to the Internet), mobile phone data, multimedia feed, global positioning data, among other data communications provided via satellite to the end user. In some embodiments, at any given time, the SNP may have antennas in contact with one or more satellites with excess data bandwidth, while prioritizing service to the customers. Accordingly, the SOC may control the SAP antenna in contact with a particular satellite to establish a PCC between the SAP antenna and the satellite that is separate from the communication channel(s)/band(s) over which the end user data communication is carried. The SOC may control the SAP antenna to perform the satellite commanding instead of or alongside the TT&C.

In some embodiments, the TT&C antennas may employ any suitable frequency band for communicating with the satellites of the constellation. For example, the TT&C antennas may be configured to utilize a Ka-band TT&C link. In some embodiment, the Ka-band is a portion of the microwave part of the electromagnetic spectrum defined as frequencies in the range 26.5-40 gigahertz (GHz), i.e. wavelengths from slightly over one centimeter down to 7.5 millimeters. In some embodiments, such a communication link may enable communications with an upload bandwidth of, e.g., 50 or more kilobits per second (kbps), such as, e.g., 56 kbps, and 200 or more kbps download, including 300 kbps or more, 400 kbps or more, or other suitable download bandwidth including 417 kbps.

In some embodiments, the satellite constellation may include numerous satellites, such as, e.g., 10 or more, 20 or more, 30 or more, 50 or more, 60 or more, 70 or more, 80 or more, 90 or more, 100 or more, 150 or more, 200 or more, 250 or more, 300 or more, 350 or more, 400 or more, 450 or more, 500 or more, 550 or more, 600 or more, 650 or more, 700 or more, 750 or more, 800 or more, 850 or more, 900 or more, 950 or more, 1000 or more, or any other suitable number of satellites, such as, e.g., between 648 and 882 satellites. In some embodiments, the ECE may control the TT&C antenna based on orchestration by the MME to control each satellite in the constellation while each satellite is in a contact window within which the respective satellite is in range of a respective TT&C antenna.

In some embodiments, the TT&C antennas may be configured to communicate with satellites in a suitable injection orbit and a suitable final orbit. For example, the injection orbit may be, e.g., 400 or more kilometers (km), 450 or more km, 500 or more km, or other suitable injection orbit. In some embodiments, the final orbit may be 500 or more km, 600 or more km, 700 or more km, 800 or more km, 900 or more km, 1000 or more km, 1100 or more km, 1200 or more km, or other suitable final orbit.

Based on the orbit of each satellite, the TT&C antennas may be controlled to enter an azimuthal and/or elevation orientation suitable to direct the TT&C link to one or more satellites. For example, the TT&C antennas may utilize, e.g., an 85.0 degree elevation, an 85.5 degree elevation, an 86.0 degree elevation, an 86.5 degree elevation, an 87.0 degree elevation, an 87.5 degree elevation, an 88.0 degree elevation, an 88.5 degree elevation, an 89.0 degree elevation, an 89.5 degree elevation, or other suitable angle of elevation. In some embodiments, the ECE may control the TT&C antennas to adjust the angle of elevation and azimuth based on, e.g., satellite orbit, telemetry, satellite payload status, space weather, orbital trajectory, satellite attitude, among other factors or any combination thereof in order to optimize connection strength and coverage.

In some embodiments, to optimize communications with satellites, the ECE may control the TT&C antennas for satellite data retrieval. In some embodiments, the satellite bus and/or payload may communicate instrument and/or component readings and status. The TT&C antennas may be controlled to request the data from each satellite to update the status of each satellite.

Alternatively or in addition, the ECE may retrieve satellite data from one or more external interfaces, such as the satellite network portal, e.g., KSAT or other satellite network. In some embodiments, the external interfaces may provide messaging and data communication between the SOC and computer systems and/or services external to the FOGS to retrieve or otherwise obtain externally sourced data and utilize external resources (e.g., processing resources, storage resources, software services, function services, etc.).

In some embodiments, the computer systems and/or services external to the FOGS may include one or more computer systems and/or services that track and/or analyze space environment context data. The space environment context data may include data indicative of conditions of a space environment in which satellites in the constellation operate, e.g. during launch and/or post-launch in orbit. The space environment may be defined as a geospatial position over the earth of one or more of the satellites, an orbital region (e.g., low earth orbit (LEO), medium earth orbit (MEO), geosynchronous orbit (GEO), high earth orbit (HEO), etc.), a time or time period, a moon phase, a precession of the earth around the sun, among other attributes of time and location in space in which the satellites are located. In some embodiments, the space environment context may be defined by conditions within the space environment, such as, e.g., space weather, natural and/or artificial bodies within a predefined range of the satellites, ephemeris of the satellites and/or natural and artificial bodies, ionospheric electron content at a position of the satellites, among other attributes or any combination thereof.

In some embodiments, examples of the computer systems and/or services external to the FOGS may include, e.g., one or more launch bases, Combined Space Operations Command (CSpOC), one or more commercial data providers, among others or any combination thereof. Such data may be stored for use in controlling the TT&C antennas, and/or the data may be reported back to the MME for use by one or more other elements.

In some embodiments, the SOC may also be in communication with a primary network operations center (NNOC). In some embodiments, the NOC is configured to manage ground network infrastructure, e.g., via load management, scheduling, or other network infrastructure management operations or any combination thereof. The primary NOC (and/or one or more alternative NOCs (ANOC)) may be configured to payload commanding, including, e.g., power control command via a satellite access point (SAP). Accordingly, in some embodiments, the NOC may collect and/or store and/or report to the MME payload commanding files. Based on the payload commanding files, the MME may orchestrate the FOGS elements to generate and provide payload commands and/or payload plan status to the NOC for communication with satellites, e.g., while payload is off. Thus, in some embodiments, the payload commanding files may include, e.g., timed instructions for a satellite to connect to the SAP, payload power levels, trajectory adjustments, instrument operation parameters, among other commanding information or any combination thereof.

In some embodiments, combining the SOC interface with the NOC for control of the SAP command and control link may utilize core infrastructure, including computing hardware, to support multiple concurrent command and telemetry instances, e.g., for multiple satellites. Accordingly, the NOC may utilize hardware resources for such a number of instances, including, e.g., a corresponding number of front-end processors (FEP) to support AES encrypted commanding with an SAP antenna for each instance, e.g., each command and telemetry support.

In some embodiments, for greater insight into satellite status, telemetry and conditions, the SOC may include interfaces with internal and external services. For example, commanding a satellite may be planned and executed based on the status of the satellite, the conditions that the satellite is in, the contact window for the satellite, and the trajectory of the satellite as well as other satellites and spacecraft. Accordingly, the SOC may retrieve data from the interfaces to characterize the satellite status, telemetry and conditions, including internal interfaces for elements, components and/or services associated with the FOGS, and external interfaces to elements, components and/or services provided by third-parties and/or remotely from the FOGS.

In some embodiments, each interface may include, e.g., a suitable interface and/or messaging technology forming a shared boundary across which two or more separate components exchange information. The exchange can be between software, computer hardware, peripheral devices, humans, and combinations of these. For example, one or more of the interfaces may employ a communication protocol for exchanging data, such as, e.g., IPX/SPX, X.25, AX.25, TCP/IP (e.g., HTTP), or other suitable communication protocols via any suitable wired and/or wireless communication infrastructure.

In some embodiments, one or more interfaces may utilize one or more software computing interface technologies, such as, e.g., Common Object Request Broker Architecture (CORBA), an application programming interface (API) and/or application binary interface (ABI), among others or any combination thereof. In some embodiments, an API and/or ABI defines the kinds of calls or requests that can be made, how to make the calls, the data formats that should be used, the conventions to follow, among other requirements and constraints. An "application programming interface" or "API" can be entirely custom, specific to a component, or designed based on an industry-standard to ensure interoperability to enable modular programming through information hiding, allowing users to use the interface independently of the implementation. In some embodiments, CORBA may normalize the method-call semantics between application objects residing either in the same address-space (application) or in remote address-spaces (same host, or remote host on a network).

In some embodiments, one or more interfaces may utilize one or more hardware computing interface technologies, such as, e.g., Universal Serial Bus (USB), IEEE 1394 (FireWire), Ethernet, Thunderbolt™, Serial ATA (SATA) (including eSATA, SATAe, SATAp, etc.), among others or any suitable combination thereof.

In some embodiments, the internal interfaces may include the NOC, including primary NOC and/or one or more alternate NOCs. In some embodiments, the NOC may be responsible for monitoring of SAPs in order to provide scheduling for commanding via SAPs to the satellite constellation. For example, the NOC may maintain a real-time, up-to-date log of scheduled SAP operations. Scheduling data representing the scheduled SAP operations may be provided to or otherwise accessible by the SOC to enable the SOC schedule operations with one or more SAPs based on SAP availability (e.g., dates and/or times when the one or more SAPs are not scheduled).

In some embodiments, the NOC may include one or more SNPs, as detailed above, for satellite payload commanding and power commanding. In some embodiments, the SNPs may be external to the NOC, and the NOC may monitor the SAPs of the SNPs via one or more interfaces. In some embodiments, the FOGS may employ a combination of external SNPs monitored via one or more external interfaces, and SNPs that are a part of the NOC and monitored by local and/or internal interfaces. In some embodiments, the SNPs may be operated and/or managed by a third-party entity not associated with the FOGS, or may be operated and/or managed by a common entity associated with the FOGS, or a combination thereof.

Accordingly, the NOC may receive from the SOC and/or the MME data associated with issuing payload command to the satellites, such as, e.g., payload commands and/or payload commanding plan status. In some embodiments, the NOC may report payload commanding files indicative of the commands sent and/or attempted by the NOC to enable the MME to implement the commanding files in fleet management operations.

In some embodiments, the internal interfaces may include a Spacecraft Factory. In some embodiments, the spacecraft factory associated with manufacture and/or production of satellites in the constellation may make satellite hardware and software information available to the MME. In some embodiments, for example, the spacecraft factory can provide to the MME spacecraft database information, such as, e.g., operating systems, flight software versions, bus identifier, payload component identifiers, payload details, data formats, among other data indicative of the construction and capabilities of each satellite, including requirements, formats, and functions for communication with each satellite. In some embodiments, the MME may query the spacecraft database information from the spacecraft factory using, e.g., spacecraft flight software loads (e.g., satellite bus and/or satellite payload software loads), or other information or any combination thereof. The spacecraft factory may respond to the query with the associated spacecraft database information, and/or log the spacecraft flight software loads in the spacecraft database to track hardware and software status of each satellite. The SOC can connect to the factory to command satellites on the ground, load flight software, load keys, and perform checkouts.

In some embodiments, the internal interfaces may include a Ground Segment Factory. The ground segment factory may communicate ground segment status and software for maintenance of the ground segment and implementation of software functionality. Accordingly, the ground segment factory may, e.g., provide ground segment software updates to update software of, e.g., the infrastructure and/or one or more of the FOGS elements. Additionally, the MME may issue ground segment incident reports, e.g., for errors and/or anomalies associated with the operation of each element of the FOGS. In response to the ground segment incident reports, the ground segment factory may issue software patches, debugging services and/or tools, software upgrades, among other ground segment maintenance tasks.

In some embodiments, the external interfaces may include a satellite ephemeris data source, e.g., CSpOC or any suitable service providing satellite positions and satellite ephemeris. For example, the external interface for the satellite positions and satellite ephemeris may be for a service owned, operated or otherwise associated with a governmental, private, non-governmental, non-profit or other organization or any combination thereof. CSpOC is the Combined Space Operations Center is a U.S.-led multinational space operations center that provides command and control of space forces for United States Space Command's Combined Force Space Component Command. CSpOC tracks and publishes satellite positions, satellite ephemeris, collision avoidance (COLA) reports, satellite catalogs, among other space craft and space body tracking information. In some embodiments, the term "ephemeris" may refer to data (e.g., one or more tables, data objects, arrays, vectors, etc.) representing the trajectory of naturally occurring astronomical objects as well as artificial satellites in the sky, i.e., the position and/or possibly velocity over time. Accordingly, the SOC may provide satellite positions for the constellation and satellite ephemeris for the satellite constellation. In response, the CSpOC may return COLA reports indicating a risk of collision with other bodies, as well as satellite catalog (SATCAT) identifiers for the satellites of the constellation as well as other bodies. In some embodiments, the SATCAT may include, e.g., a nine-digit number assigned by the United States Space Command (USSPACECOM) in the order of launch or discovery to all artificial objects in the orbits of Earth and those that left Earth's orbit. Accordingly, the SOC may use the CSpOC interface to determine nearby bodies to satellites in the constellation and collision risks in order to better orchestrate the FOGS elements for automated commanding and orbit adjustment.

In some embodiments, the external interfaces may include, e.g., one or more launch base(s). The launch base may track launch separation vectors and/or satellite injection data for each launch of satellites. In some embodiments, the separation vectors represent the position and/or velocity of stages or pieces of a launch vehicle as the stages and/or pieces separate after liftoff. In some embodiments, the satellite injection data may include, e.g., position and/or velocity of the satellite on the launch vehicle after liftoff and both before and after separation from the launch vehicle into orbit. In some embodiments, the SOC may provide the pre-launch voice (e.g., go/no-go, among other pre-launch vocalizations) to the launch base(s).

In some embodiments, the external interfaces may include a weather and/or space weather data source, e.g., national oceanic and atmospheric administration (NOAA) or any suitable service providing satellite positions and satellite ephemeris. For example, the external interface for the weather and/or space weather may be for a service owned, operated or otherwise associated with a governmental, private, non-governmental, non-profit or other organization or any combination thereof. In some embodiments, the NOAA published space weather data, such as, e.g., radio blackouts, solar radiation storms, and geomagnetic storms caused by disturbances from the Sun. Accordingly, the SOC may retrieve the space weather data to inform tasking, commanding and telemetry of the satellites in the constellation.

In some embodiments, the external interfaces may include an earth orientation, rotation and/or reference data source, e.g., International Earth Rotation and Reference Systems Service (IERS) or any suitable service providing earth orientation, rotation and/or reference data. For example, the external interface for the earth orientation, rotation and/or reference data may be for a service owned, operated or otherwise associated with a governmental, private, non-governmental, non-profit or other organization or any combination thereof. In some embodiments, the IERS s the body responsible for maintaining global time and reference frame standards, notably through its Earth Orientation Parameter and International Celestial Reference System groups. For example, the IERS determines and publishes earth orientation parameters (EOP) to describe irregularities in the rotation of the planet, and leap seconds. In some embodiments, a leap second is a one-second adjustment that is occasionally applied to Coordinated Universal Time (UTC), to accommodate the difference between precise time (International Atomic Time (TAI), as measured by atomic clocks) and imprecise observed solar time (UTI), which varies due to irregularities and long-term slowdown in the Earth's rotation. EOP and leap seconds may affect the satellite's ability to determine a precise location and/or trajectory. Accordingly, to better control each satellite, the SOC may retrieve from the IERS a current EOP and any leap seconds.

In some embodiments, the external interfaces may include navigation satellite system data source, e.g., the international global navigation satellite system service (IGS) or any suitable service providing navigational and/or position data from satellite measurements. For example, the external interface for the navigational and/or position data may be for a service owned, operated or otherwise associated with a governmental, private, non-governmental, non-profit or other organization or any combination thereof. The IGS provides global navigation satellite system (GNSS) information from one or more GNSSs. For example, the GNSS may include positioning data from, e.g., Global positioning system (GPS), BeiDou navigation satellite system (BDS), Galileo, GLONASS, Indian Regional Navigation Satellite System IRNSS)/Navigation Indian Constellation (NavIC), Quasi-zenith satellite system (QZSS), among any other suitable GNSS or any combination thereof.

In some embodiments, the external interfaces may include, e.g., a public and/or private cloud platform. Long-term storage of constellation data may be desirable. The long-term storage may be implemented via local storage, or by remote storage in the public cloud platform. Where the public cloud platform is employed, the SOC may store data for long-term storage in the public cloud, which may also be used for offline processing. The SOC may then access the data via stored data queries, for which the public cloud may respond with associated data.

In some embodiments, the MME may orchestrate operation-specific elements on a dynamic and real-time basis based on data received from internal and/or external interfaces. Each element, as detailed above, may be virtualized on top of core infrastructure such that the MME may scale each element based on demands for telemetry, tracking and control of satellites in the constellation, e.g., based on a number of satellites in contact, a number of operations needing to be performed on each satellite, among other factors or any combination thereof. Thus, the MME may dynamically balance and orchestrate the resources of the core infrastructure utilized by each element. In some embodiments, the elements may include the CCE element for performing command and telemetry operations, the MPE for performing operation planning and command load verification, the FDE for determining orbit and maneuver planning and calibration, the ECE for controlling TT&C antennas and SNP antennas to communicate with the satellites in the constellation.

In some embodiments, the CCE may perform command and telemetry operations, including, e.g., satellite commanding, telemetry verification, system visualization, contact automation, automated command and script execution, command upload verification, telemetry decommutation and verification, telemetry analysis/trending/display, command and telemetry database updates, telemetry screen updates, satellite state-of-health visualization, among other command and control tasks or any combination thereof.

In some embodiments, the MPE may perform operation planning and command load verification, including, e.g., constellation planning, contact planning and scheduling, mission feasibility assessment, schedule deconfliction and replanning, activity planning (engineering and maintenance), constellation optimization, payload planning, mission planning visualization, among other mission planning operations or any combination thereof.

In some embodiments, the FDE may perform all orbit determination-related and maneuver planning-related operations, such as, e.g., orbit determination, maneuver planning and verification, conjunction analysis, COLA response, collision avoidance, constellation optimization, station-keeping analysis and verification, constellation orbit visualization, among other flight dynamics control operations or any combination thereof.

In some embodiments, elements may instantiate and/or call one or more simulation engines to perform hardware simulation and/or software simulation to pre-test commands and generate visualizations. In some embodiments, the simulations may be performed on a distributed basis with different FOGS elements simulating different aspects of the hardware and/or software as a result of the commands. For example, a particular FOGS element may utilize inputs and outputs from other FOGS elements to perform simulations of tasks for which the particular FOGS element is configured to implement. In some embodiments, the inputs and outputs from the other FOGS elements may be results of simulations, actual satellite management/commanding operations, or a combination thereof.

In some embodiments, the simulations may be performed by software simulators associated with a satellite, e.g., a satellite model, type or configuration or combination thereof. In some embodiments, a software simulator may run in a virtual machine. In some embodiments, the software simulator may test ground software that is related to commanding, and test satellite procedures (scripted or manual or both). In some embodiments, by running the software simulator in a virtual machine, multiple virtual machines can be started up with respective software simulators, where each software simulator may simulate ground software and satellite procedures for a respective one of the satellites.

In some embodiments, the simulations may be performed using hardware in a simulated environment, e.g., simulated space environment. The simulated environment may include actual satellite hardware set up on an artificial space environment (e.g., having temperature, pressure, radiation, etc. that would be expected in orbit, e.g., low earth orbit). In some embodiments, the hardware in the simulated environment may be used to test satellite procedures and satellite software on actual hardware.

In some embodiments, the simulations may be performed using a constellation simulator. The constellation simulator may include a software simulator that simulates multiple satellites (e.g., part of a constellation or a full constellation), albeit at a lower fidelity than the above detail software simulators to preserve compute resources. In some embodiments, the constellation simulator may be run on a virtual machine.

In some embodiments, one or more operators may interact with the SOC via the MME using terminals in communication with the MME. The terminals may include any suitable computing device in communication with the MME via any suitable communication interface. In some embodiments, the terminals may include or be incorporated, partially or entirely into one or more computing devices including at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In some embodiments, the terminals may be remote from the MME, and thus connected to the MME via a networked connection. In some embodiments, the network may include any suitable computer network, including, two or more computers that are connected with one another for the purpose of communicating data electronically. In some embodiments, the network may include a suitable network type, such as, e.g., a public switched telephone network (PTSN), an integrated services digital network (ISDN), a private branch exchange (PBX), a wireless and/or cellular telephone network, a computer network including a local-area network (LAN), a wide-area network (WAN) or other suitable computer network, or any other suitable network or any combination thereof. In some embodiments, a LAN may connect computers and peripheral devices in a physical area by means of links (wires, Ethernet cables, fiber optics, wireless such as Wi-Fi, etc.) that transmit data. In some embodiments, a LAN may include two or more personal computers, printers, and high-capacity disk-storage devices, file servers, or other devices or any combination thereof. LAN operating system software, which interprets input and instructs networked devices, may enable communication between devices to: share the printers and storage equipment, simultaneously access centrally located processors, data, or programs (instruction sets), and other functionalities. Devices on a LAN may also access other LANs or connect to one or more WANs. In some embodiments, a WAN may connect computers and smaller networks to larger networks over greater geographic areas. A WAN may link the computers by means of cables, optical fibers, or satellites, cellular data networks, or other wide-area connection means. In some embodiments, an example of a WAN may include the Internet.

In some embodiments, the terminals may be local to the MME and thus may communicate via a direct connection and/or one or more local area networks, e.g., wires, Ethernet cables, fiber optics, wireless such as Wi-Fi, PCI express, small computer system interface (SCSI), parallel AT attachment (PATA), serial AT attachment (SATA), HyperTransport™, InfiniBand™, Wishbone, Compute Express Link (CXL), among others or any combination thereof. In some embodiments, the terminals may be thin clients in communication with servers hosting the FOGS elements, such as, e.g., using virtual desktop infrastructure (VDI). In some embodiments, the VDI may be persistent or non-persistent.

Thus, operators may access the FOGS via the terminals and the MME to view satellite and/or constellation status visualizations, status reports, event reports, operator work tickets, among other information related to the operation and performance of the FOGS elements, the interfaces and the satellites in the constellation. Moreover, the operator may input user interactions to the terminal to, e.g., configure workflows, establish workflow and event rules, administer and troubleshoot FOGS elements, address tickets, manually select commands for a particular satellite, view telemetry and tracking data, among other manual tasks to administer the system.

Figure 1B:
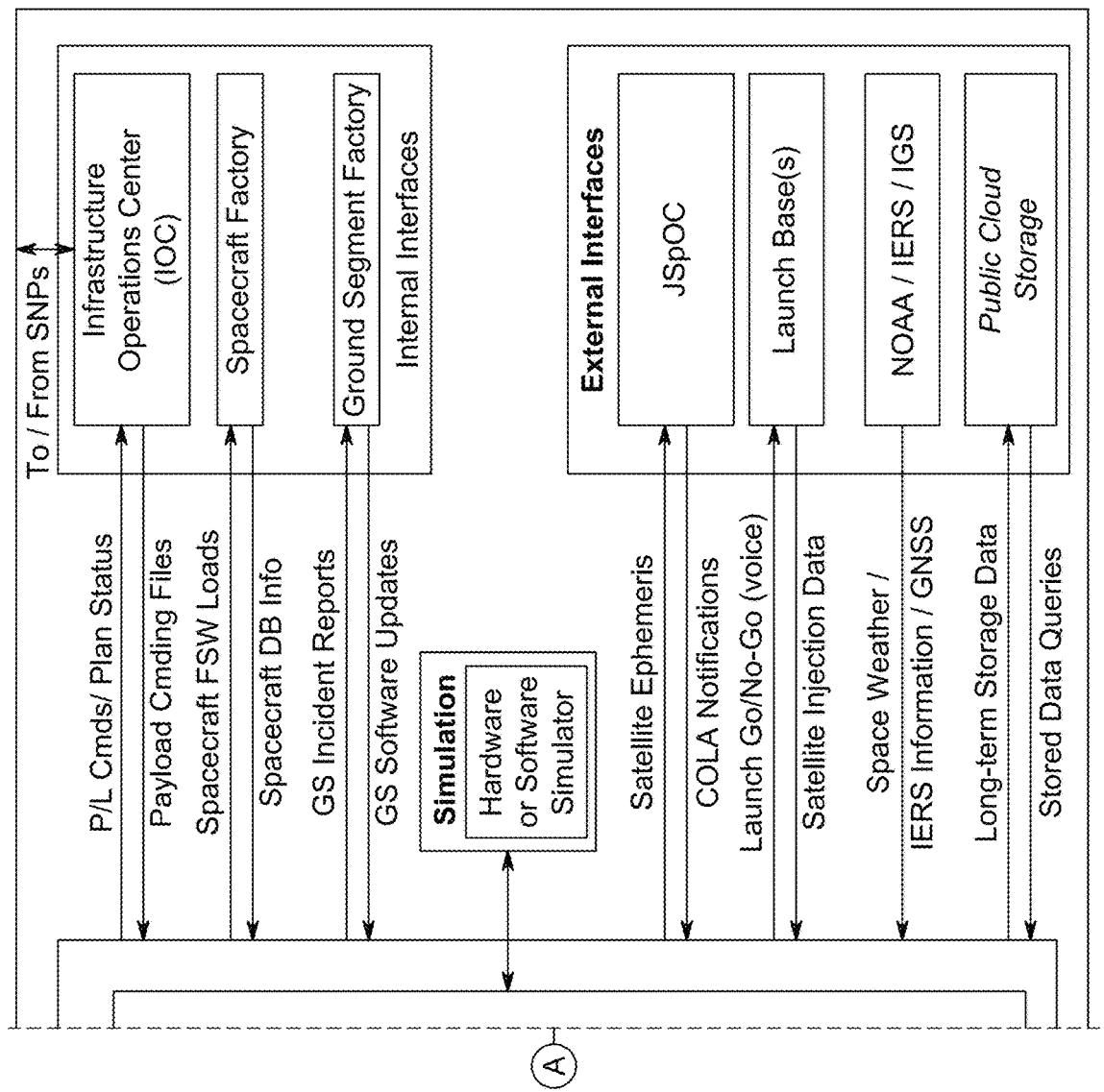

In some embodiments, the above description regarding FIG. 1 provides an example according to one or more embodiments of the present disclosure where particular FOGS elements are configured to include certain components and/or functions. In some embodiments, one or more components and/or functions may be relocated to one or more different FOGS elements. Indeed, in some embodiments, the FOGS is configured in one or more virtual environments, thus enabling flexibility of the various components and/or functions of the FOGS and each FOGS elements. Thus, embodiments are not restricted to the particular assignment of components and/or functions to particular FOGS elements.

Figure 2:
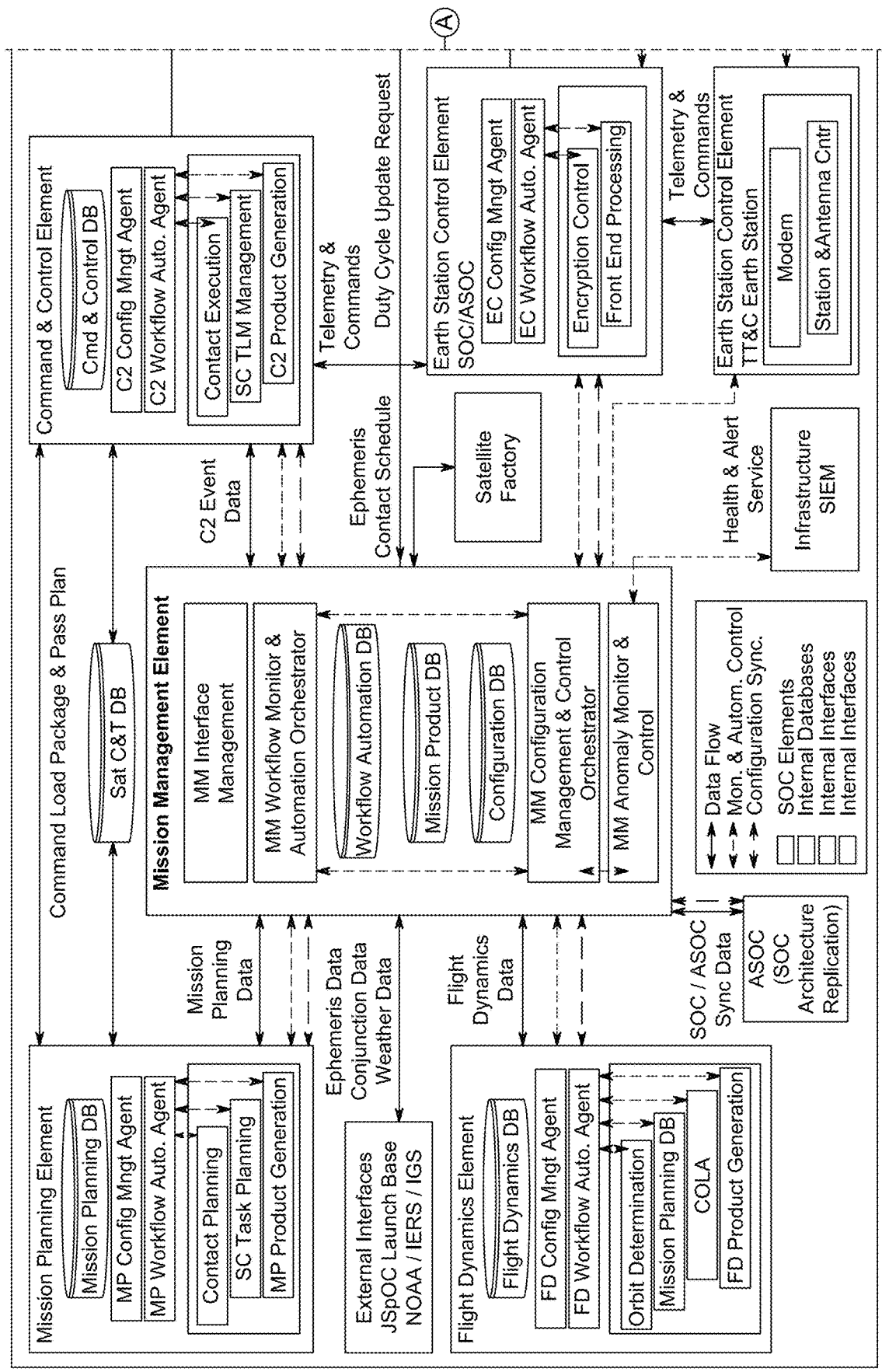
FIG. 2 depicts a top-level fleet operation ground segment automation architecture in accordance with one or more embodiments of the present disclosure.
Figure 2:
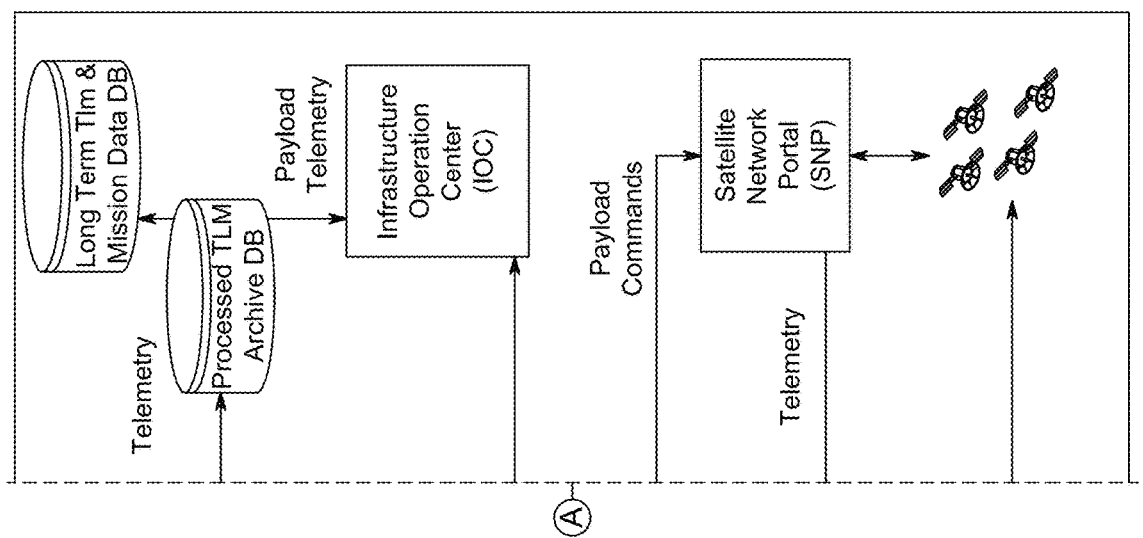

Referring to FIG. 2, a top-level fleet operation ground segment automation architecture is depicted according to one or more embodiments of the present disclosure.

In some embodiments, the MME may orchestrate and manage each FOGS element via exchange of data and monitoring and automation control flows, including coordinating operation scheduling across the FOGS elements to optimize the use of the infrastructure and ensure dependencies of operations by each element is satisfied. Accordingly, in some embodiments, the MME may include components for effectuating the control of the various FOGS elements and coordinating data from internal and external interfaces, including, e.g., exchanging monitoring and control data with CCE, MPE, FDE, ECE, and Infrastructure SIEM, synchronizing configuration with CCE, MPE, FDE, ECE, and generating Situational Awareness and constellation display data.

In some embodiments, the MME may include a mission management (MM) interface management component. The MM interface management component generates and renders user interfaces on terminals for user interaction. The MM interface management may include hardware components, software components or a combination thereof configured to receive and process operator inputs, and to generate, format and render interface elements for display to the operator. Such interface elements may include display contents, such as, e.g., an anomaly report from one or more FOGS elements, a satellite contact schedule for one or more satellites, a constellation visualization, mission planning product (e.g., mission planning data and mission analysis), flight dynamics product (e.g., flight dynamics data representing orbit determination, maneuver planning, collision avoidance, etc.), command and control product (e.g., contact execution events, telemetry events and analysis, commands and/or command sequences, payload duty cycle commands, etc.), as well as reports from internal and external interfaces including, e.g., COLA reports, conjunction data, weather data, ephemeris data, contact schedule, among others or any suitable combination thereof.

As used herein, the term "product" refers to results of analysis of data, such as, e.g., visualization, tabulations, aggregation, distillation, filter, reformat, analytics results, simulation and/or model, statistical analysis, machine learning model output, event/health/status log, alerts and notifications, among other outputs based on processed and/or formatted data. In some embodiments, a product may be formatted to allow for display of the product as contents of one or more user interface elements at a terminal, e.g., based on rendering and/or generation by the MM interface management component.

In some embodiments, the MME may include a MM workflow monitor and automation orchestrator. In some embodiments, the MM workflow monitor and automation orchestrator (hereinafter "workflow orchestrator"), may enable automated configuration, coordination, and management of FOGS elements (e.g., hardware and/or software). In some embodiments, the workflow orchestrator may orchestrate operations of each FOGS element. As detailed above, each FOGS element may be instantiated on the infrastructure in a containerized and/or virtualized form. Accordingly, the MM orchestrator is configured to dynamically employ the containerized and/or virtualized FOGS elements in a service-oriented architecture to align fleet management needs with the elements, data and infrastructure. Indeed, the workflow orchestrator manage instantiation and execution of each FOGS elements in order to implement automation workflows that include operations performed by various of the FOGS elements in a manner that minimizes costs, maximizes efficiency and performance within constraints (e.g., physical, data, cost, or other constraints). Each element may also have its own automation orchestrator, which may or may not interface with the MM orchestrator.

In some embodiments, to manage and/or orchestrate the FOGS elements and the performance of workflows, the workflow orchestrator may utilize an MM configuration management and control orchestrator to distribute FOGS element configurations based on feedback regarding FOGS element health and status provided by an MM anomaly monitor and control component.

In some embodiments, the MM configuration management and control orchestrator (hereinafter "configuration orchestrator"), may track and control changes in the software of each FOGS element and the bus and payload of each satellite in the constellation. To do so, the configuration orchestrator may be configured for, e.g., revision control and the establishment of baselines. For example, if something goes wrong, the configuration orchestrator may determine a change in operation based on a pre-established baseline, and determine when and how the change occurred. Accordingly, the configuration orchestrator may, e.g., identify configurations, configuration items and baselines, implement a controlled change process, record and/or report element and/or infrastructure status, validate contents of each configuration, manage process and tools, manage the software and hardware forming the infrastructure, among other tasks based on defined configurations and requirements.

In some embodiments, configuration management, including tracking and controlling changes in software, versioning, deploying software, among other software configuration-related operations may be implemented by infrastructure/platform software in an Infrastructure-as-Code implementation. In some embodiments, IaC may include managing and provisioning computer data centers through machine-readable definition files and/or deployment scripts, rather than physical hardware configuration or interactive configuration tools. To enable IaC, the infrastructure/platform managed by this process may include: physical equipment, such as bare-metal servers, virtual machines, associated configuration resources or any combination thereof. In some embodiments, the definitions/deployment scripts may be in a version control system. The code in the definition files may use either scripts or declarative definitions or both to automate deployment and management of the FOGS elements, rather than maintaining the code through manual processes. In some embodiments, therefore, each FOGS element may be deployed, tracked and/or managed in a virtualized environment using the infrastructure/platform software on top of the hardware of one or more computer data centers. In some embodiments, configuration management may be implemented within the MME or via the infrastructure/platform software as IaC, or any combination thereof.

In some embodiments, rather than configuration management centralized to the MME or implemented by IaC, each FOGS element may have configuration management services specific to itself. Thus, FOGS element-specific tracking and controlling of changes in software, versioning, deploying software, among other FOGS element-specific software configuration-related operations may be implemented may be performed internally by each FOGS element associated with each FOGS element-specific software configuration-related operation.

In some embodiments, maintain up-to-date configurations at each FOGS element, the configuration orchestrator may periodically synchronize configurations. To do so, the configuration orchestrator may access a configuration associated with each FOGS element in a configuration database. The configuration database may provide a central repository with the master set of configurations.

In some embodiments, the configurations may be automatically generated, e.g., based on resources and constraints of each FOGS element, spacecraft database information from the satellite factory, COLA reports and/or conjunction data from the CSpOC interface, duty cycles of the NOC, errors and/or other anomalies detected by the anomaly service and/or one or more of the FOGS elements, among other configuration-related data defining configuration needs or any suitable combination thereof. For example, the payload instructions that come in from the NOC may be compared to configurations and database information to determine what is the proper command and parameters that the version of software onboard the satellite would recognize and execute (e.g., the same instruction might be different commands depending on which version of software is onboard the satellite). Thus, the configuration orchestrator may maintain the master set of configurations for each satellite software version, each FOGS element software version of each FOGS element, among other components, such that the configuration orchestrator may validate instructions, commands, parameters, etc. between components against the commands/parameters, including the structuring data therein, against the configurations stored in the configuration database. In another example, each FOGS element may generate power usage reports that are based on a software model of the physical satellite in space. The power usage reports are based on configurations such as hardware serial numbers of specific satellite components. In another example, each FOGS element may generate constellation status products that are ingested by the NOC, including, e.g., configuration items set by operators describing the state of different components onboard the satellite.

In some embodiments, the configurations may be administered, curated, customized, or otherwise managed by an operator via a user interface managed by the interface management component. For example, the operator may use a terminal access the MME and the configuration database via a user interface provided to the terminal by the interface management component. The operator may then select configurations and/or configuration parameters to manually configure one or more configurations. In some embodiments, the configurations may be generated by a combination of automated and manual processes.

Herein, the term "database" refers to an organized collection of data, stored, accessed or both electronically from a computer system. The database may include a database model formed by one or more formal design and modeling techniques. The database model may include, e.g., a navigational database, a hierarchical database, a network database, a graph database, an object database, a relational database, an object-relational database, an entity-relationship database, an enhanced entity-relationship database, a document database, an entity-attribute-value database, a star schema database, or any other suitable database model and combinations thereof. For example, the database may include database technology such as, e.g., a centralized or distributed database, cloud storage platform, decentralized system, server or server system, among other storage systems. In some embodiments, the database may, additionally or alternatively, include one or more data storage devices such as, e.g., a hard drive, solid-state drive, flash drive, or other suitable storage device. In some embodiments, the database may, additionally or alternatively, include one or more temporary storage devices such as, e.g., a random-access memory, cache, buffer, or other suitable memory device, or any other data storage solution and combinations thereof.

Depending on the database model, one or more database query languages may be employed to retrieve data from the database. Examples of database query languages may include: JSONiq, LDAP, Object Query Language (OQL), Object Constraint Language (OCL), PTXL, QUEL, SPARQL, SQL, XQuery, Cypher, DMX, FQL, Contextual Query Language (CQL), AQL, among suitable database query languages.

The database may include one or more software, one or more hardware, or a combination of one or more software and one or more hardware components forming a database management system (DBMS) that interacts with users, applications, and the database itself to capture and analyze the data. The DBMS software additionally encompasses the core facilities provided to administer the database. The combination of the database, the DBMS and the associated applications may be referred to as a "database system".

Therefore, in some embodiments, periodically, the MME may initiate communication with the CCE to synchronize CCE-specific configurations. CCE specific configurations may specify CCE specific operating parameters, including software and hardware resources, software and hardware utilization, task requirements, and task needs (e.g., dependencies, among other needs). Thus, the configuration orchestrator may request a current configuration and current status of the CCE. The CCE may have a command and control (CC) configuration management agent that logs the current configuration and status, e.g., in a CC database. Thus, in response to the request form the configuration orchestrator, the CC configuration management agent may access the current configuration and status in the CC database and report the current configuration and status to the configuration orchestrator. In some embodiments, the configuration orchestrator may synchronize the configuration associated with the CCE in the master set of configurations in the configuration database. Upon receiving the configuration, the CC configuration management agent may update the configuration in the C2 database to implement the up-to-date and within specification configuration.

Similarly, in some embodiments, periodically, the MME may initiate communication with the ECE to send the ECE TT&C schedule and ephemeris data and/or to monitor antenna status. In some embodiments, the MME may perform other operations relative to the ECE, such as, e.g., to synchronize ECE-specific configurations. ECE specific configurations may specify ECE specific operating parameters, including software and hardware resources, software and hardware utilization, task requirements, and task needs (e.g., dependencies, among other needs). Thus, the configuration orchestrator may request a current configuration and current status of the ECE. The ECE may have an earth station control (EC) configuration management agent that logs the current configuration and status, e.g., in an EC database. Thus, in response to the request form the configuration orchestrator, the EC configuration management agent may access the current configuration and status in the EC database and report the current configuration and status to the configuration orchestrator. The configuration orchestrator may then compare the current configuration and status to a baseline and determine whether the configuration of the ECE is up-to-date and/or meeting the needs and requirements of the ECE. Where the configuration orchestration determines that the current configuration and status is out of specification (e.g., not up-to-date and/or not meeting the needs and requirements), the configuration orchestrator may synchronize the configuration associated with the ECE in the master set of configurations in the configuration database. Upon receiving the configuration, the EC configuration management agent may update the configuration in the EC database to implement the up-to-date and within specification configuration.

In some embodiments, periodically, the MME may initiate communication with the FDE to synchronize FDE-specific configurations. FDE specific configurations may specify FDE specific operating parameters, including software and hardware resources, software and hardware utilization, task requirements, and task needs (e.g., dependencies, among other needs). Thus, the configuration orchestrator may request a current configuration and current status of the FDE. The FDE may have a flight dynamics (FD) configuration management agent that logs the current configuration and status, e.g., in a FD database. Thus, in response to the request form the configuration orchestrator, the FD configuration management agent may access the current configuration and status in the FD database and report the current configuration and status to the configuration orchestrator.

In some embodiments, additionally or alternatively, the MME may initiate communication with the FDE to employ the configuration orchestrator to compare the current configuration and status to a baseline and determine whether the configuration of the FDE is up-to-date and/or meeting the needs and requirements of the FDE. Where the configuration orchestration determines that the current configuration and status is out of specification (e.g., not up-to-date and/or not meeting the needs and requirements), the configuration orchestrator may synchronize the configuration associated with the FDE in the master set of configurations in the configuration database. Upon receiving the configuration, the FD configuration management agent may update the configuration in the FD database to implement the up-to-date and within specification configuration.

In some embodiments, periodically, the MME may initiate communication with the MPE to synchronize MPE-specific configurations to, e.g., provide a properly configured input to the MPE. In some embodiments, MPE specific configurations may specify MPE specific operating parameters, that manage data, messages, commands, instructions, etc. and parameters thereof, software and hardware resources, software and hardware utilization, task requirements, and task needs (e.g., dependencies, among other needs). Thus, the configuration orchestrator may request a current configuration and current status of the MPE. The MPE may have a mission planning (MP) configuration management agent that logs the current configuration and status, e.g., in a MP database. Thus, in response to the request from the configuration orchestrator, the MP configuration management agent may access the current configuration and status in the MP database and report the current configuration and status to the configuration orchestrator, and/or to provide properly configured data, messages, commands, instructions, etc. and parameters thereof to the MPE based on the MPE specific configurations.

In some embodiments, additionally or alternatively, the MME may initiate communication with the FDE to employ the configuration orchestrator may compare the current configuration and status to a baseline and determine whether the configuration of the MPE is up-to-date and/or meeting the needs and requirements of the MPE. Where the configuration orchestration determines that the current configuration and status is out of specification (e.g., not up-to-date and/or not meeting the needs and requirements), the configuration orchestrator may synchronize the configuration associated with the MPE in the master set of configurations in the configuration database. Upon receiving the configuration, the MP configuration management agent may update the configuration in the MP database to implement the up-to-date and within specification configuration.

In some embodiments, both the workflow orchestrator and the configuration orchestrator may utilize feedback data from the MM anomaly monitor and control component (hereinafter "anomaly service"). In some embodiments, the anomaly service may interface with each FOGS component to receive data associated with detected anomalies, detected errors, failures, resource constraints, and other system log data indicative of health and status of each FOGS element. In some embodiments, for example, the anomaly service may periodically query each FOGS element (e.g., individually or globally on a same or separate schedule) to request the health and status data. In some embodiments, the query may be performed by a health and alert service operated at the infrastructure level based on control by the anomaly service. Alternatively, or in addition, the anomaly service may directly query each FOGS element, or any combination thereof.

In some embodiments, the workflow monitor may communicate with each FOGS element to implement fleet management workflows. The workflows may be stored in a workflow automation database of the MME. Each workflow may be associated with a particular satellite, fleet, constellation, management operation, or other categorization. Accordingly, the workflow automation database may catalog the workflows based on each applicable categorization.

In some embodiments, the workflows may be automatically generated, e.g., based on configurations implemented by the configuration orchestrator, spacecraft database information from the satellite factory, COLA reports and/or conjunction data from the CSpOC interface, among other data defining workflow needs or any suitable combination thereof. In some embodiments, the workflows may be administered, curated, customized, or otherwise managed by an operator via a user interface managed by the interface management component. For example, the operator may use a terminal access the MME and the workflow automation database via a user interface provided to the terminal by the interface management component. The operator may then select workflows and/or workflow parameters to manually configure one or more workflows. In some embodiments, the workflows may be generated by a combination of automated and manual processes.

In some embodiments, the operator may access the terminal and load an operator-programmable workflow tool. The operator-programmable workflow tool may enable the user to execute an ordered set of activities determined by the operator for one or more of the FOGS elements. The operator-programmable workflow tool may interface with the FOGS elements via the MME interface management component in order to provide the operator determined set of activities. The MME may then monitor the status of the ordered set of activities as the associated FOGS element implements the associated workflow.

For example, in some embodiments, the operator may access the terminal and load an operator-programmable workflow tool. The operator-programmable workflow tool may enable the user to execute an ordered set of CCE activities determined by the operator across any subset of satellites across the fleet. These activities can command the satellite, and the operator-programmable workflow tool may display the status of the ordered set of CCE activities (e.g., whether each CCE activity has been performed, has resulted in an error, or other status of the activities or any combination thereof) in order to allow the operator can monitor the status of the workflows and ensure that everything is done.

In another example, the FDE can initiate spacecraft maneuvers and attitude change requests. In some embodiments, the spacecraft maneuvers and attitude change requests may be automatically generated and/or operator requested, e.g., via the terminal and the interface management component. In some embodiments, the spacecraft maneuvers and attitude change requests are received by MME and the appropriate scheduling is performed with MPE and the appropriate commands are sent to CCE for transmission to the satellite. The workflow may also handle cases where there is a scheduling conflict and enables the FDE operators to try a different time.

In some embodiments, the workflow orchestrator may perform element tasking based on a particular workflow associated with a particular element and/or fleet management operation. The workflow orchestrator may trigger the execution of a workflow based on data received via one or more of the interfaces, either internal, external or both. For example, the MME may receive ephemeris data, conjunction data, weather data, among other externally sourced data from external interfaces. Such externally sourced data may indicate a need to reroute one or more satellites, reorganize the constellation or a portion of the constellation based on space weather conditions, control the duty cycle and power state of satellite payloads, among other operations. Similarly, the MME may receive satellite ephemeris, contact schedules and/or telemetry from the NOC, e.g., via the SNPs among other internally sourced data. In some embodiments, based on the internally sourced data, alone or in combination with the externally sourced data, the workflow orchestrator may determine the need to reroute one or more satellites, reorganize the constellation or a portion of the constellation, control the duty cycle and power state of satellite payloads, among other operations.

In some embodiments, the workflow orchestrator may refer to a centralized component, e.g., within the MME, to manage workflow execution across the FOGS and the FOGS elements. In some embodiments, additionally or alternatively, the workflow orchestrator may refer to one or more decentralized components with an instance, version or FOGS element-specific workflow orchestrator implemented in each FOGS element. Thus, in the decentralized implementations, each respective FOGS element may be configured to orchestrate the execution of workflows specific/internal to each respective FOGS element. In some embodiments, additionally or alternatively, the workflow orchestrator may be implemented at a core services or infrastructure level, e.g., via the IaC detailed above.

In some embodiments, based on the needs indicated by the internally sourced data and/or the externally sourced data, the workflow orchestrator may orchestrate monitoring and automation control of each FOGS element to execute an associated workflow for commanding satellites to manage the constellation. In some embodiments, the monitoring and automation control may include tasking each element according to operations of the workflow.

In some embodiments, the operations of one element may rely on data from another element. Accordingly, the workflow orchestrator may also exchange data with each element to relay the data to other elements for which there may be dependencies.

In some embodiments, the workflow orchestrator may orchestrate the tasking and execution of functions by each of the MPE, CCE, FDE, and ECE. Each of the MPE, CCE, FDE, and ECE may include a workflow automation agent to execute the associated operations according to the tasking provided by the workflow orchestrator. Each workflow automation agent may include one or more components for executing jobs associated with a particular operation.

In some embodiments, the MPE may automate the execute of functions, including, e.g., contact planning, satellite constellation task planning, and MP product generation, among other functions or any combination thereof. An MP workflow automation agent of the MPE may orchestrate each of the MPE functions to generate MP product and other mission planning data. In some embodiments, the MP workflow automation agent may store the MP product, the other mission planning data, as well as the operations performed as part of an element-specific workflow and any other suitable data or any combination thereof. In some embodiments, the MP workflow automation agent may additionally orchestrate and automate anomaly identification, error reporting, system logging, among other functions for element-specific event and status data.

In some embodiments, the MPE may exchange mission planning data with the MME. Such exchange may include sending workflow status, events, status, anomalies, errors, system logs, MP product, among other data, to the MME. The workflow orchestrator may relay some or all of the data mission planning data to one or more other elements for inform operations performed by the one or more other elements as part of the workflow. Additionally, the workflow orchestrator may relay some or all data from the CCE, ECE, FDE, NOC, satellite factory and/or external interfaces to the MPE to inform the contact planning, satellite constellation task planning and/or MP product generation performed by the MPE as part of the workflow.

In some embodiments, the CCE may automate the execute of functions, including, e.g., contact execution, satellite constellation telemetry management, and CC product generation, among other functions or any combination thereof. An CC workflow automation agent of the CCE may orchestrate each of the CCE functions to generate CC product and other command and control data. In some embodiments, the CC workflow automation agent may store the CC product, the other command and control data, as well as the operations performed as part of an element-specific workflow and any other suitable data or any combination thereof. In some embodiments, the CC workflow automation agent may additionally orchestrate and automate anomaly identification, error reporting, system logging, among other functions for element-specific event and status data.

In some embodiments, the CCE may exchange command and control data with the MME. Such exchange may include sending workflow status, events, status, anomalies, errors, system logs, CC product, among other data, to the MME. The workflow orchestrator may relay some or all of the data command and control data to one or more other elements for inform operations performed by the one or more other elements as part of the workflow. Additionally, the workflow orchestrator may relay some or all data from the MPE, ECE, FDE, NOC, satellite factory and/or external interfaces to the CCE to inform the contact planning, satellite constellation task planning and/or CC product generation performed by the CCE as part of the workflow.

In some embodiments, the MPE and CCE may exchange data directly for more efficient planning and commanding. Generating commands for instructing a satellite and payload may have dependencies on the mission planning generated by the MPE. Accordingly, mission planning data and command and control data may be separately stored in a satellite command and telemetry database accessible by both the MPE and the CCE. As a result, both the MPE and the CCE may collaborate on command and telemetry data for more accurate and efficient command planning and generation. In some embodiments, the CCE may also provide the command load and pass plan directly to the MPE, e.g., for storage in the mission planning database to inform future mission planning operations.

In some embodiments, the FDE may automate the execute of functions, including, e.g., orbit determination, maneuver planning, collision avoidance (COLA), and FD product generation, among other functions or any combination thereof. An FD workflow automation agent of the FDE may orchestrate each of the FDE functions to generate FD product and other flight dynamics data. In some embodiments, the FD workflow automation agent may store the FD product, the other flight dynamics data, as well as the operations performed as part of an element-specific workflow and any other suitable data or any combination thereof. In some embodiments, the FD workflow automation agent may additionally orchestrate and automate anomaly identification, error reporting, system logging, among other functions for element-specific event and status data.

In some embodiments, the FDE may exchange flight dynamics data with the MME. Such exchange may include sending workflow status, events, status, anomalies, errors, system logs, FD product, among other data, to the MME. The workflow orchestrator may relay some or all of the data flight dynamics data to one or more other elements for inform operations performed by the one or more other elements as part of the workflow. Additionally, the workflow orchestrator may relay some or all data from the MPE, CCE, ECE, NOC, satellite factory and/or external interfaces to the FDE to inform the contact planning, satellite constellation task planning and/or FD product generation performed by the FDE as part of the workflow.

In some embodiments, the ECE may automate the execute of functions, including, e.g., encryption control of payload command communications, and front end processing of payload commands for SNP control, and modem control and station and antenna control of TT&C antennas, among other functions or any combination thereof. An EC workflow automation agent of the ECE may orchestrate each of the ECE functions to execute satellite commanding and telemetry acquisition to complete the fleet management workflow orchestrated by the workflow orchestrator. In some embodiments, the EC workflow automation agent may additionally orchestrate and automate anomaly identification, error reporting, system logging, among other functions for element-specific event and status data.

In some embodiments, the ECE may exchange telemetry and command data with the MME. Such exchange may include sending workflow status, events, status, anomalies, errors, system logs, EC product, among other data, to the MME. The workflow orchestrator may relay some or all of the data telemetry and command data to one or more other elements for inform operations performed by the one or more other elements as part of the workflow. Additionally, the workflow orchestrator may relay some or all data from the MPE, CCE, FDE, NOC, satellite factory and/or external interfaces to the ECE to inform the contact planning, satellite constellation task planning and/or EC product generation performed by the ECE as part of the workflow.

In some embodiments, the ECE may execute commands generated by the CCE, e.g., via front-end processors. To more efficiently provide the commands to the ECE for communication to the satellites, the CCE may directly communicate the commands to the ECE, thus bypassing the MME and reducing processing steps. Moreover, in response to sending the commands to the satellites, the ECE may receive telemetry in return. In some embodiments, the ECE may directly communicate the raw telemetry to the CCE for processing, such as cleansing, normalization, analysis and other processing steps. The CCE may then store the raw and/or processed telemetry in a processed telemetry archive database for future reference and audit. For example, the processed telemetry may be stored in a long-term telemetry and mission database, e.g., in cloud storage. The processed telemetry archive database may be accessible by the NOC in order to maintain satellite telemetry and provide infrastructural services, e.g., data processing, storage and retrieval, information assurance, access management, and other core functionality.

In some embodiments, the anomaly service may monitor the operation of the workflow orchestrator and the configuration orchestrator to determine health and status data for the MME. In some embodiments, the anomaly service may monitor workflow automation logs, such as workflows and workflow data sent to each FOGS element and FOGS element product received from each FOGS element, including, e.g., a time, data size, and/or contents of each communication of workflow-related data. In some embodiments, the anomaly service may implement one or more anomaly detection protocols based on the logs and the workflow-related data to detect whether any errors or other anomalies have occurred.

Such health and status data may be employed by the workflow orchestrator and the configuration orchestrator.

Alternatively, or additionally, the FOGS may be configured with data pipelines to effectuate fleet operations. The data pipelines include triggers along an end-to-end processing pipeline through the FOGS elements. Thus, an input (e.g., an operator request, automated process, satellite or FOGS element feedback/status, or other input or any combination thereof) may trigger a first operation to produce a first output, which may in turn trigger a second operation to produce a second output, and so on until the output product is produced (e.g., satellite commanding, operator alerts and/or visualizations at the terminal, among others or any combination thereof). For example, ephemeris products that go to the NOC may be initiated in FDE one or more times per day (e.g., 3 times per day per satellite). The ephemeris produce may trigger jobs such as trajectory modeling, data transformation and formatting. In some embodiments, each data pipeline may be internal to a respective FOGS elements, or one or more data pipeline may span across multiple FOGS elements such that a data pipeline that produces an output of a first FOGS element may use the output as input to a second FOGS element to continue the data pipeline by triggering additional jobs in the second FOGS element.

In some embodiments, the above description regarding FIG. 2 provides an example according to one or more embodiments of the present disclosure where particular FOGS elements are configured to include certain components and/or functions. In some embodiments, one or more components and/or functions may be relocated to one or more different FOGS elements. Indeed, in some embodiments, the FOGS is configured in one or more virtual environments, thus enabling flexibility of the various components and/or functions of the FOGS and each FOGS elements. Thus, embodiments are not restricted to the particular assignment of components and/or functions to particular FOGS elements.

Figure 3A:
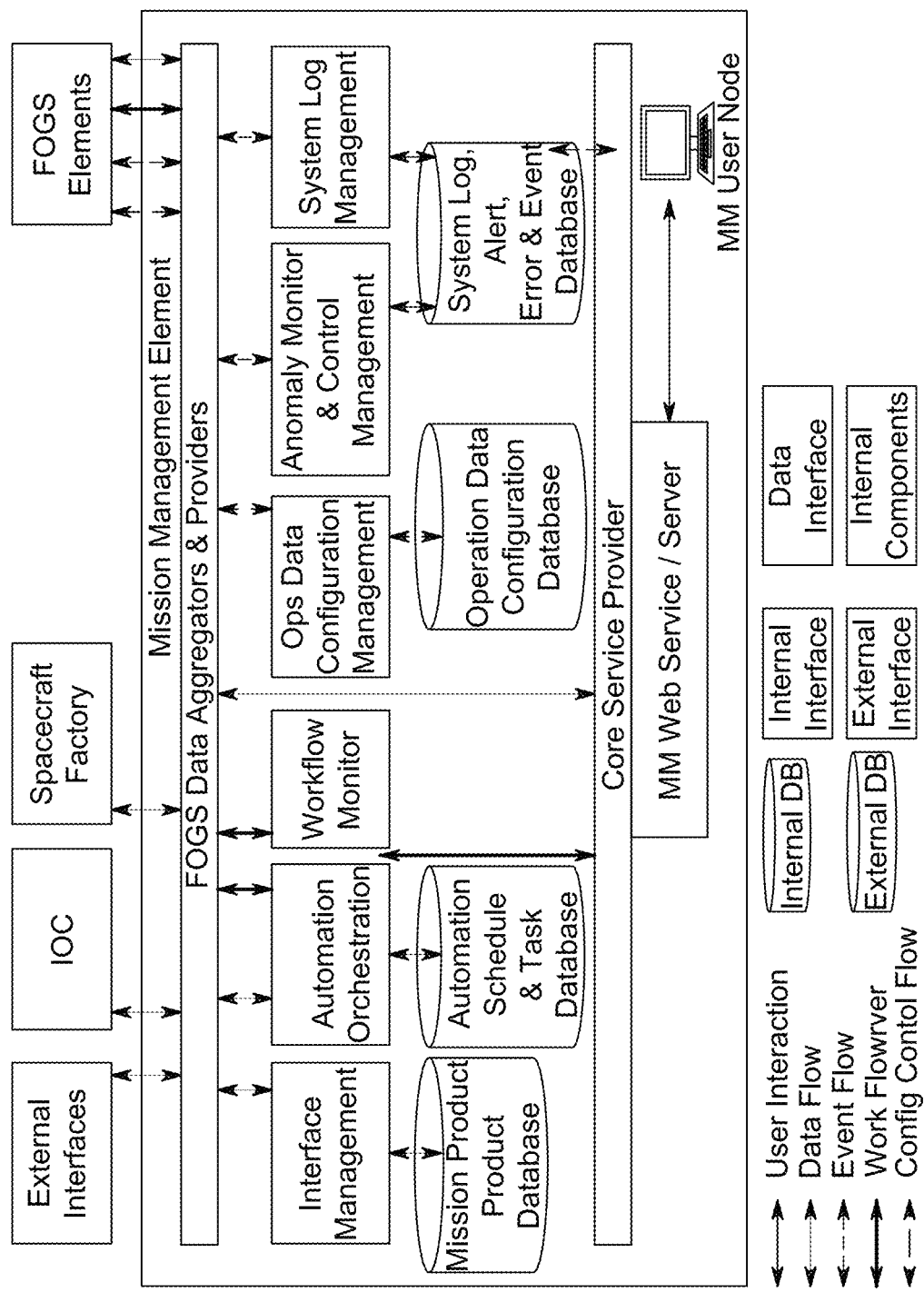
FIG. 3A depicts a functional view of the mission management element of the FOGS

Referring to FIG. 3A, a functional view of the mission management element of the FOGS is depicted according to one or more embodiments of the present disclosure In some embodiments, the MME may include components to perform workflow management of the FOGS elements, automation orchestration, anomaly monitoring and control notification to other elements and to top-level users, system error and event logging, data and product storage and retrieval, provide a system status display, among other orchestration and management functions to enable a dynamic and scalable orchestrated service-oriented FOGS system.

In some embodiments, to provide mission management to manage each FOGS element, the MME may include an interface layer have FOGS data aggregators and providers. The FOGS data aggregators and providers may interface with internal and external interfaces, such as, the NOC, the spacecraft factory, and each FOGS element.

In some embodiments, in communication the FOGS data aggregators and providers, the MME may have a core services provider, which provides access to infrastructural resources and functionality. The core service provider may exchange data with external interfaces, the NOC, the spacecraft factory and FOGS elements via the interfaces layer. Additionally, the core services provider may communicate with an MM web service/server. The MM web services/server may serve data and MP product to an MM user node, such as a terminal, to generate and render an UI and content thereof, wherein the content is populated with data regarding fleet operations management, such as statuses, events, anomalies, commands, satellite visualizations, constellation visualizations, configurations, workflows, telemetry, externally sourced data from the external interfaces, among other data and visualizations. The MM web service/server may also be configured to enable user interaction with the user interface to perform, e.g., administrative functions, such as managing and curating workflows, customizing workflows, managing and curating configurations, customizing configurations, debugging, among other user interactions or any combination thereof.

In some embodiments, MME services may be implemented leveraging the FOGS data aggregators and providers and the core service providers. The MME services may each perform particular tasks to efficiently and automatically manage workflow execution by the FOGS elements.

In some embodiment, the MME services may include an interface management service. In some embodiments, the interface management service may access mission product in a mission product database, such as, e.g., MP product, CC product, FD product, etc. received from the FOGS elements. The interface management service may generate reports and/or visualizations or other user interface elements to rendering and display to internal and/or external users.

In some embodiment, the MME services may include an automation orchestration service. In some embodiments, the automation orchestration service may communicate workflows and workflow data via interface layer. In some embodiments, the automation orchestration service communicates workflows and workflow data with core service provider. In some embodiments, the automation orchestration service communicates automation data with interface layer and stores the automation data in the automation schedule and task database.

In some embodiment, the MME services may include a workflow monitor service. In some embodiments, the workflow monitor service may interface with each FOGS element to retrieve operation statuses related to the execution of operations of the workflow. Accordingly, the workflow monitor may provide insight into workflow progress and success and/or failure events.

In some embodiment, the MME services may include an ops data configuration management service. In some embodiments, the ops data configuration management service may control the FOGS elements via the FOGS data aggregators and providers based on configurations In some embodiment, the MME services may include an anomaly monitor and control management service. In some embodiments, the anomaly monitor and control management service may communicate anomaly and control events with each FOGS element, including automated identification of anomalies in satellite operations, constellation configuration, and/or FOGS element operation. In some embodiments, the anomaly monitor and control management service may store and access anomaly and control events in a system log, alert, error and event database.

In some embodiment, the infrastructure/platform software, e.g., of the IaC platform, may employ a system log management service to monitor, track and store system event data representing system events from across the FOGS, including from one or more of the FOGS elements. Alternatively, or in addition, the MME services may include a system log management service to ingest some or all of the system event data for anomaly monitoring and control, e.g., by the anomaly monitor and control management service. In some embodiments, the system log management service may communicate system events with FOGS elements and core services, and stores and access system events in the system log, alert, error and event database.

In some embodiments, the above description regarding FIG. 3A provides an example according to one or more embodiments of the present disclosure the MME is configured to include certain components and/or functions. In some embodiments, one or more components and/or functions may be relocated to one or more different FOGS elements. Indeed, in some embodiments, the FOGS, including the MME, is configured in one or more virtual environments, thus enabling flexibility of the various components and/or functions of the FOGS and each FOGS elements. Thus, embodiments are not restricted to the particular assignment of components and/or functions to particular FOGS elements.

Figure 3B:
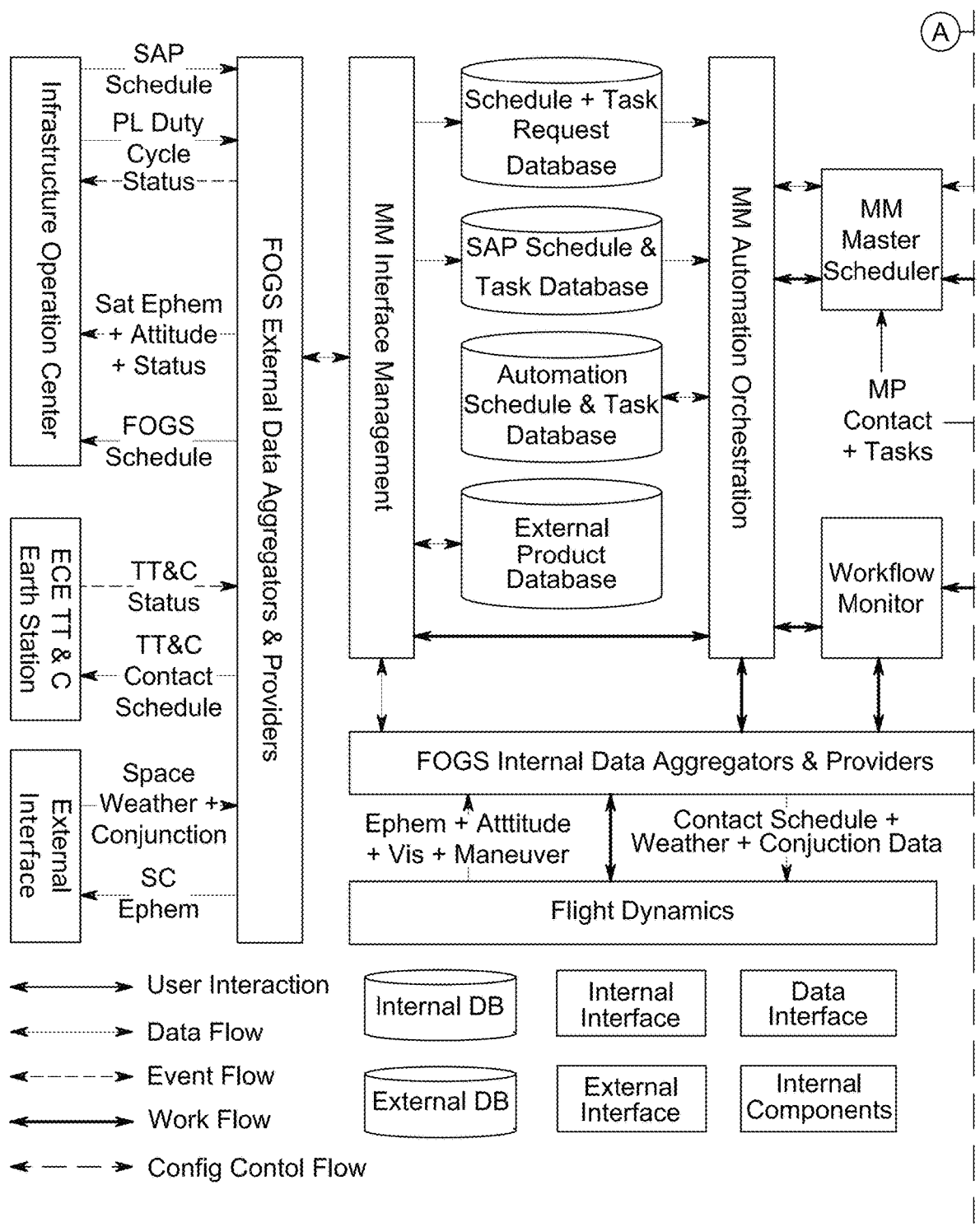
FIG. 3B depicts an MME workflow in accordance with one or more embodiments of the present
Figure 3B:
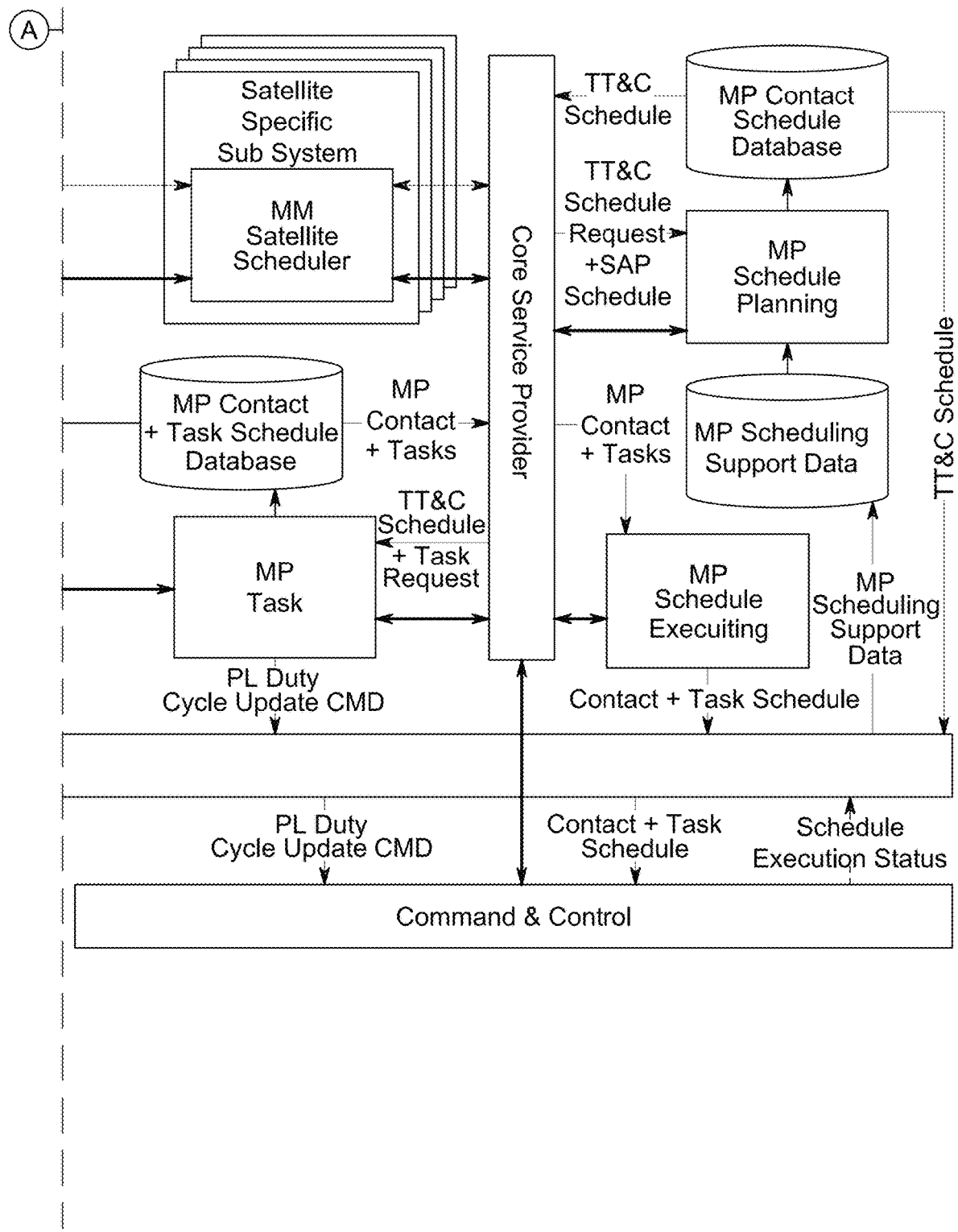

Referring to FIG. 3B, an MME workflow is depicted according to one or more embodiments of the present disclosure.

In some embodiments, the MME controls the flow of information through the SOC. The MME collects information from outside sources and distributes tasking to proper element for execution, and populates local databases with real-time information for internal use and for situational awareness displays to the operators. To do so, the MME may employ a workflow monitor, an MM master scheduler, an MM automation orchestration service, and to monitor workflow execution via FOGS element data and statuses, schedule workflow operations across the FOGS elements, and orchestrate the sequence of FOGS element tasking based on the workflow operations and the FOGS element data and statuses, respectively.

In some embodiments, the MME may use FOGS external data aggregators and providers to interface with the NOC, the ECE, and external interfaces. In some embodiments, the FOGS external data aggregators and providers may interface with the ECE TT&C earth station to retrieve TT&C status data and to provides a TT&C contact schedule.

In some embodiments, the FOGS external data aggregators and providers may interface with the external interface to retrieve space weather and conjunction data, and to provide constellation ephemeris.

In some embodiments, the FOGS external data aggregators and providers may interface with the NOC to provide data including: FOGS scheduling, satellite ephemeris, satellite attitude and satellite status, and SOC status. In some embodiments, attitude may refer to the orientation of an aerospace vehicle with respect to an inertial frame of reference or another entity such as the celestial sphere, certain fields, and nearby objects, etc. In some embodiments, status may be the status of payload components and/or bus of each satellite.

In some embodiments, the FOGS external data aggregators and providers may interface with the NOC to retrieve a satellite access point (SAP) schedule and payload duty cycle.

In some embodiments, the MM interface management service coordinates data, event, workflow and configuration communication/messaging with internal and external interfaces (aggregators and providers). For example, the MM interface management service may orchestrate the sending of SOC outputs, including, e.g., FOGS schedule to NOC, satellite ephemeris, attitude and status to NOC, TT&C contact schedule to ECE TT&C earth station, contact schedule, weather and conjunction data to FDE, payload duty cycle update command to CCE, contact and task schedule to CCE, among others or any combination thereof. In some embodiments, coordinating the sending of SOC outputs may include determining and imposing timing, monitoring for trigger events (e.g., receiving data and/or completing tasks of a workflow, etc.), among other coordination and orchestration functions.

In some embodiments, the MM interface management service may also coordinate data pipeline jobs in the data pipelines detailed above. For example, an output from a first FOGS element may trigger the interface management service to provide the output to a second FOGS element according to a configuration of a respective data pipeline. The output may then serve as input in the second FOGS element to trigger subsequent jobs in the data pipeline.

Similarly, in some embodiments, the MM interface management service may orchestrate the requesting and/or access of outputs from FOGS elements and other interfaces, including, e.g., space weather and conjunction data from external interface, SAP schedule from NOC, payload duty cycle from NOC, satellite constellation ephemeris, attitude, visibility and maneuver data from FDE, TT&C status from ECE TT&C earth station, schedule execution status from CCE, among other inputs to the SOC for effectuating workflow execution.

In some embodiments, the MM automation orchestration service may manage and orchestrate the implementation and execution of workflows by each FOGS element. The MM automation orchestration service may employs a workflow monitor to monitor workflow progress, status and execution across the CDE, CCE and MPE, e.g., via the FOGS internal data aggregators and providers, e.g., based on inputs from each FOGS element.

In some embodiments, a workflow may require task execution by one or more of the FOGS elements and/or may be measured by inputs/feedback from one or more FOGS elements. Accordingly, the MM automation orchestration service may employ a mission management master scheduler. In some embodiments, the mission master scheduler may receive mission planning contact and task data, e.g., from a mission planning contact and task schedule database populated by a mission planning task of the MPE.

In some embodiments, the mission master scheduler may generate scheduling for MP contact and tasks e.g., via a queue, and provides data and workflow to an MM satellite scheduler of a satellite specific sub-system for each satellite.

In some embodiments, the MM satellite scheduler schedules contact and tasks for a specific satellite based on data and workflow communications with the mm master schedule.

In some embodiments, the mission master scheduler may communicate the data and workflow communications with the mm automation orchestration to orchestrate the FOGS elements according to the scheduling.

Figure 4:
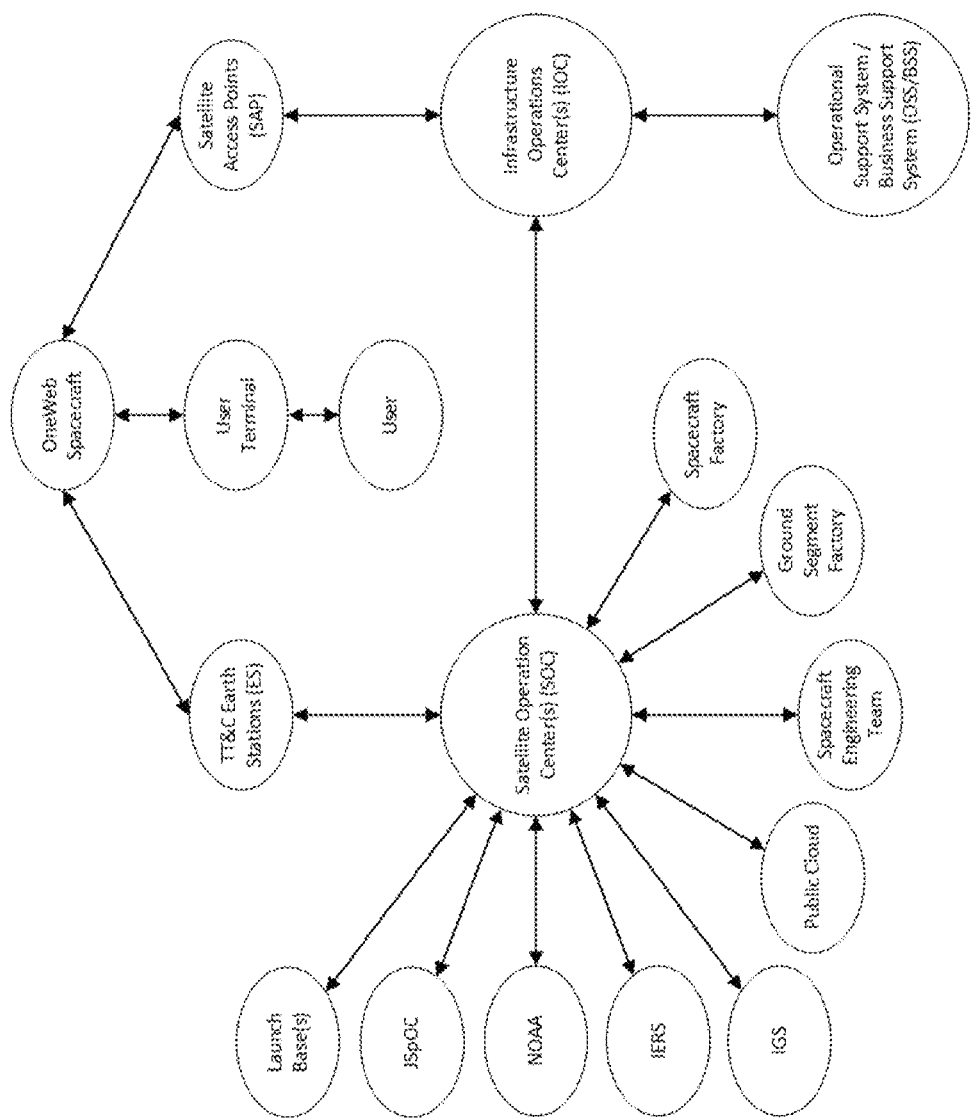
FIG. 4 depicts FOGS interfaces in accordance with one or more embodiments of the present disclosure.

Referring to FIG. 4, FOGS interfaces is depicted according to one or more embodiments of the present disclosure.

In some embodiments, the SOC may interface with one or more internal interfaces and one or more external interfaces. The internal interfaces may interface with elements and/or systems associated with the FOGS, while the external interfaces may interface with services and/or systems that are external to the FOGS system.

In some embodiments, the internal interfaces may include, e.g.: an SOC-to-TT&C Earth Station, an SOC-to-NOC, an SOC-to-Spacecraft Factory, an SOC-to-GS Factory, an SOC-to-Engineering Team, an SOC-to-Public Cloud (e.g., using a cloud environment such as Amazon™ Web Services, Google Cloud, Microsoft Azure, or other cloud environment or any combination thereof), among others or any combination thereof.

In some embodiments, the external interfaces may include, e.g.: an SOC-to-Launch Bases, an SOC-to-CSpOC, an SOC-to-NOAA, an SOC-to-IERS, an SOC-to-IGS, among others or any combination thereof.

Figure 5A:
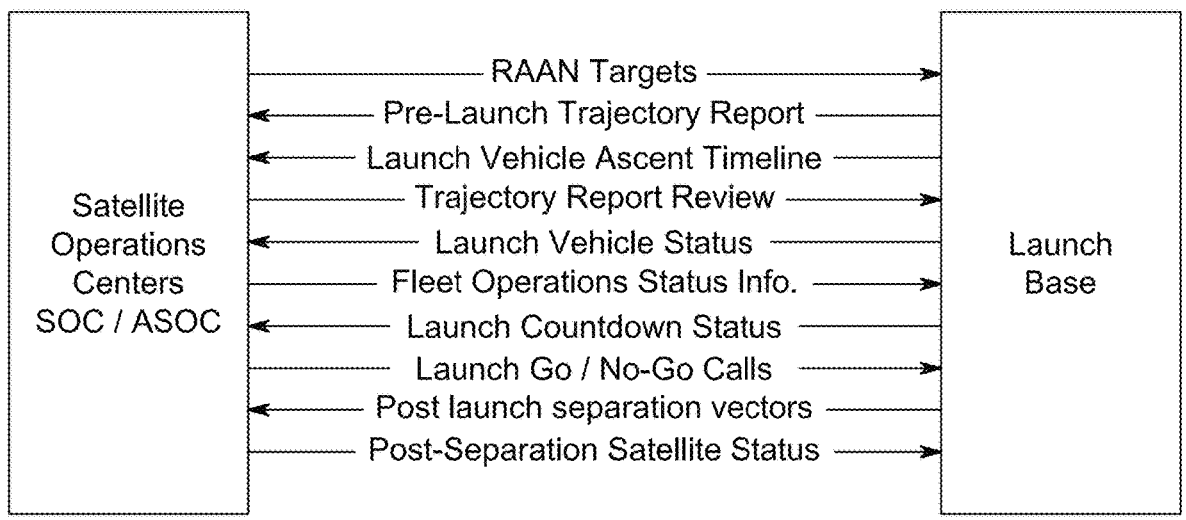
FIG. 5A depicts a launch base interface with the SOC of the FOGS in accordance with one or more embodiments of the present disclosure.

Referring to FIG. 5A, a launch base interface with the SOC of the FOGS is depicted according to one or more embodiments of the present disclosure.

In some embodiments, an SOC interface with a launch base may enable data messaging between the SOC and the launch base. In some embodiments, the data/message types may include a sequence of messages of particular types, where the sequence may include messages related to Launch Vehicle Trajectory, LV Status, and Post-Separation Vectors. For example, the sequence may include, real-time air advisory network (RAAN) targets sent from the SOC to the launch base, pre-launch trajectory report sent from the launch base to the SOC, launch vehicle ascent timeline sent from the launch base to the SOC, trajectory report review sent from the SOC to the launch base, launch vehicle status sent from the launch base to the SOC, fleet operations status information sent from the SOC to the launch base, launch countdown status sent from the launch base to the SOC, launch go/no-go calls sent from the SOC to the launch base, post-launch separation vectors sent from the launch base to the SOC, and post-separation satellite status sent from the SOC to the launch base In some embodiments, the message frequency may include any suitable frequency to enable a launch sequence countdown and reporting, with verification.

In some embodiments, the data and/or messages may be sent over a connection suitable for the data type. For example, Email may be used for pre-launch information, voice may be used for countdown and Go/No-Go status information, and any suitable electronic communication line for post separation information. Other suitable connection types may be used or any combination thereof.

Figure 5B:
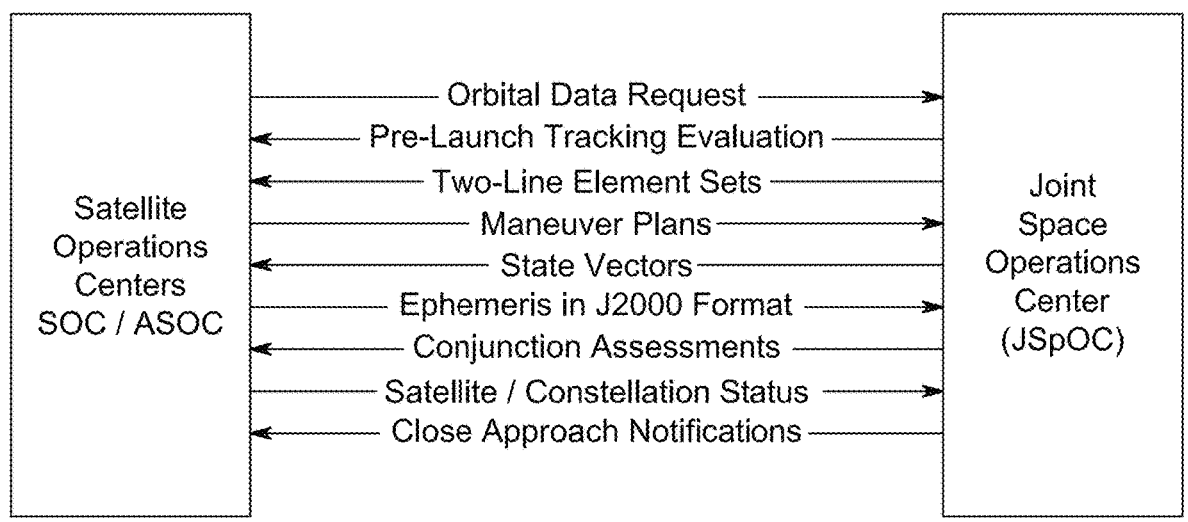
FIG. 5B depicts a CSpOC interface with the SOC of the FOGS in accordance with one or more embodiments of the present disclosure.

Referring to FIG. 5B, a CSpOC interface with the SOC of the FOGS is depicted according to one or more embodiments of the present disclosure.

In some embodiments, an SOC interface with a CSpOC may enable data messaging between the SOC and the CSpOC. In some embodiments, the data/message types may include a sequence of messages of particular types, where the sequence may include messages related to related to satellite position, satellite maneuvers, Conjunction Assessments, and Close Approaches. For example, the sequence may include sending orbital data request to CSpOC, receiving pre-launch tracking evaluation from CSpOC, receiving two-line element sets from CSpOC, sending maneuver plans to CSpOC, receiving state vectors from CSpOC, sending ephemeris to CSpOC (e.g., in a suitable format such as in J2000 format, which is the current standard epoch of equatorial coordinates), receiving conjunction assessments from CSpOC, sending satellite/constellation status to CSpOC, and receiving close approach notifications from CSpOC.

In some embodiments, the message frequency may include any suitable frequency to enable up-to-date satellite position, satellite maneuvers, Conjunction Assessments, and Close Approaches, such as, e.g., daily, twice a day, three times a day, four times a day, five times a day, six times a day, hourly, or other suitable frequency.

In some embodiments, the data and/or messages may be sent over a connection suitable for the data type. For example, email for Orbital Data Requests and other administrative data, voice for message coordination, and Https secure website Space-track.org for satellite position information.

Figure 5C:
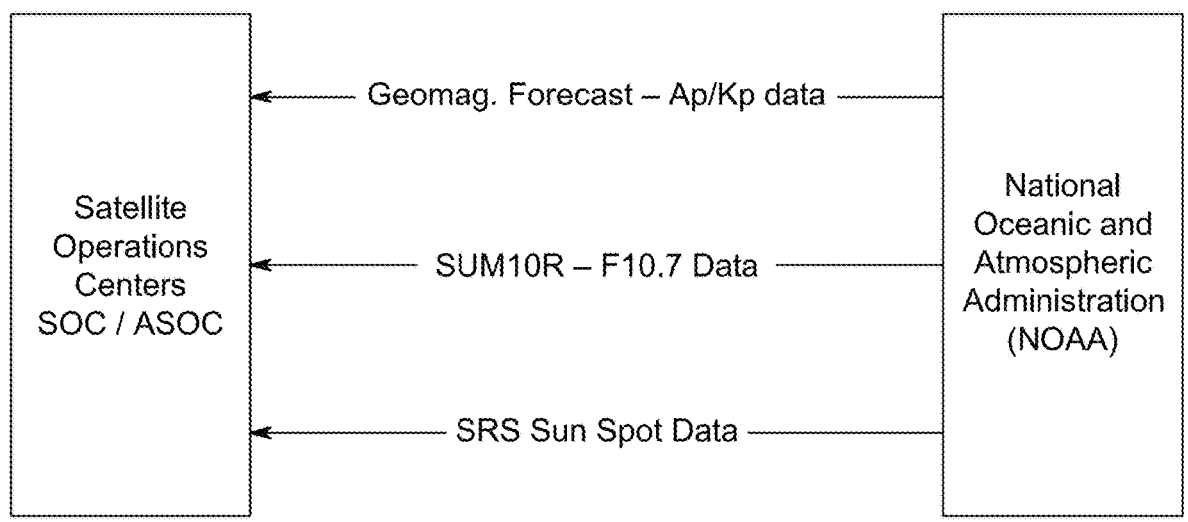
FIG. 5C depicts a SOC-to-National Oceanic and Atmospheric Administration (NOAA) Interface with the SOC of the FOGS in accordance with one or more embodiments of the present disclosure.

Referring to FIG. 5C, a SOC-to-National Oceanic and Atmospheric Administration (NOAA) Interface with the SOC of the FOGS is depicted according to one or more embodiments of the present disclosure.

In some embodiments, an SOC interface with NOAA may enable data messaging between the SOC and the NOAA. In some embodiments, the data/message types may include a sequence of messages of particular types, where the sequence may include messages related to related to Space Weather as reported by NOAA. For example, the sequence may include, e.g., receiving geomagnetic forecast (e.g., Ap/Kp data) from the NOAA, receiving SUM10R-F10.7 data from the NOAA, and receiving solar region summary (SRS) sunspot data from the NOAA.

In some embodiments, Kp index measures solar particle radiation by its magnetic effects and may be used as a proxy for the energy input from the solar wind to Earth. In some embodiments, Ap data may include derived from the Kp index as the earliest occurring maximum 24-hour value obtained by computing an 8-point running average of successive 3-hour Ap indices during a geomagnetic storm event and is uniquely associated with the storm event.

In some embodiments, SUM10R refers to radio burst data, e.g., radio bursts in a 10 cm range. In some embodiments, F10.7 refers to the F10.7 index, which is a measure of the noise level generated by the sun at a wavelength of 10.7 cm at the earth's orbit.

In some embodiments, the message frequency may include any suitable frequency to enable up-to-date space weather data, such as, e.g., daily, twice a day, three times a day, four times a day, five times a day, six times a day, hourly, or other suitable frequency.

In some embodiments, the data and/or messages may be sent over a connection suitable for the data type. For example, text files from NOAA File Transfer Protocol (FTP) site (ftp.swpc.noaa.gov/pub/).

Figure 5D:
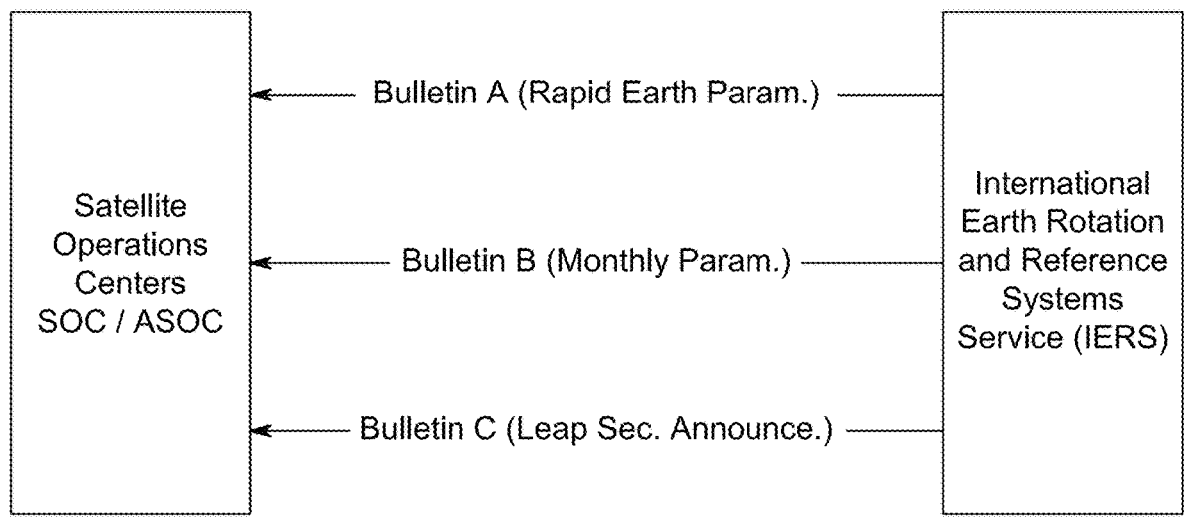
FIG. 5D depicts an International earth rotation and reference systems service (IERS) with the SOC of the FOGS in accordance with one or more embodiments of the present disclosure.

Referring to FIG. 5D, an International earth rotation and reference systems service (IERS) with the SOC of the FOGS is depicted according to one or more embodiments of the present disclosure.

In some embodiments, an SOC interface with IERS may enable data messaging between the SOC and IERS. In some embodiments, the data/message types may include a sequence of messages of particular types, where the sequence may include messages related to related to Earth rotational, position, and leap second data. For example, the sequence may include receiving, from IERS, bulletin A (rapid earth parameters), bulletin B (monthly earth parameters), and bulletin C (leap second announcements).

In some embodiments, the message frequency may include any suitable frequency to enable earth parameters and leap second announcements, such as, e.g., bi-annually, quarterly, monthly, weekly, daily, twice a day, three times a day, four times a day, five times a day, six times a day, hourly, or other suitable frequency.

In some embodiments, the data and/or messages may be sent over a connection suitable for the data type. For example, text files from IERS File Transfer Protocol FTP site (ftp.iers.org/products/).

Figure 5E:
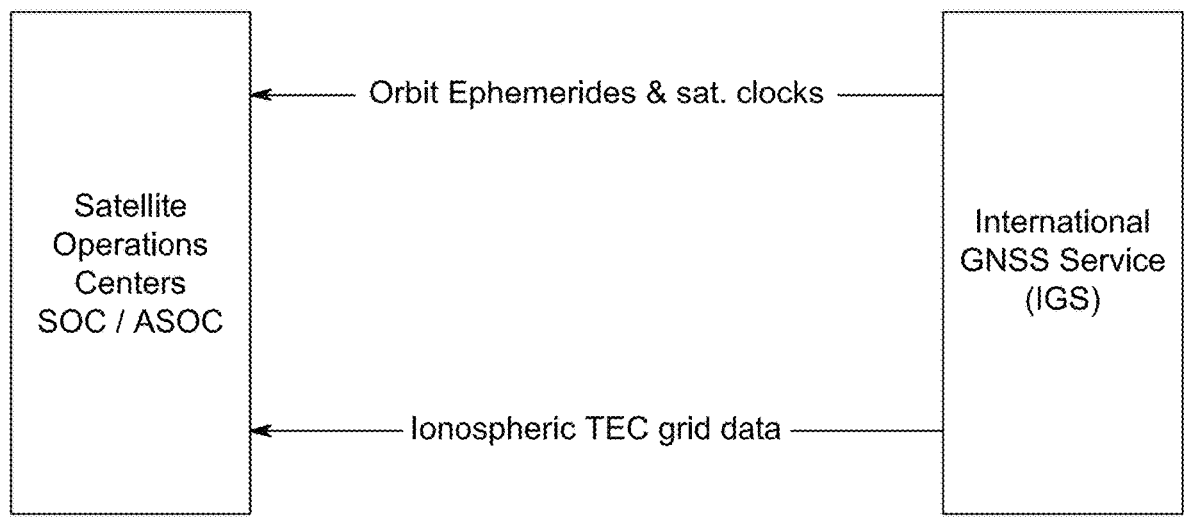
FIG. 5E depicts a SOC-to-International GNSS Service (IGS) Interface with the SOC of the FOGS in accordance with one or more embodiments of the present disclosure.

Referring to FIG. 5E, a SOC-to-International GNSS Service (IGS) Interface with the SOC of the FOGS is depicted according to one or more embodiments of the present disclosure.

In some embodiments, an SOC interface with IGS may enable data messaging between the SOC and IGS. In some embodiments, the data/message types may include a sequence of messages of particular types, where the sequence may include messages related to related to clock and timing information. For example, the sequence may include receiving, from IGS, orbit ephemeris and satellite clocks, and ionospheric total electron content (TEC) grid data.

In some embodiments, the message frequency may include any suitable frequency to enable up-to-date positioning, satellite clock data and orbit ephemeris, such as, e.g., every minute, every 10 minutes, every 15 minutes, every 30 minutes, every hour, every two hours, every 3 hours, every four hours, every six hours, every eight hours, every twelve hours, every day, once a week, or other suitable frequency. In some embodiments, the frequency for the ionospheric electron content data (e.g., TEC) may be received less frequently than orbit ephemeris and satellite clock data and still be up-to-date. Thus, the TEC may be received, e.g., every day, once a week, once every two weeks, once a month, or other suitable frequency.

In some embodiments, the data and/or messages may be sent over a connection suitable for the data type. For example, text files from IGS File Transfer Protocol FTP site at GSFC (ftp://cddis.gsfc.nasa.gov/pub/gps/products/).

Figure 6A:
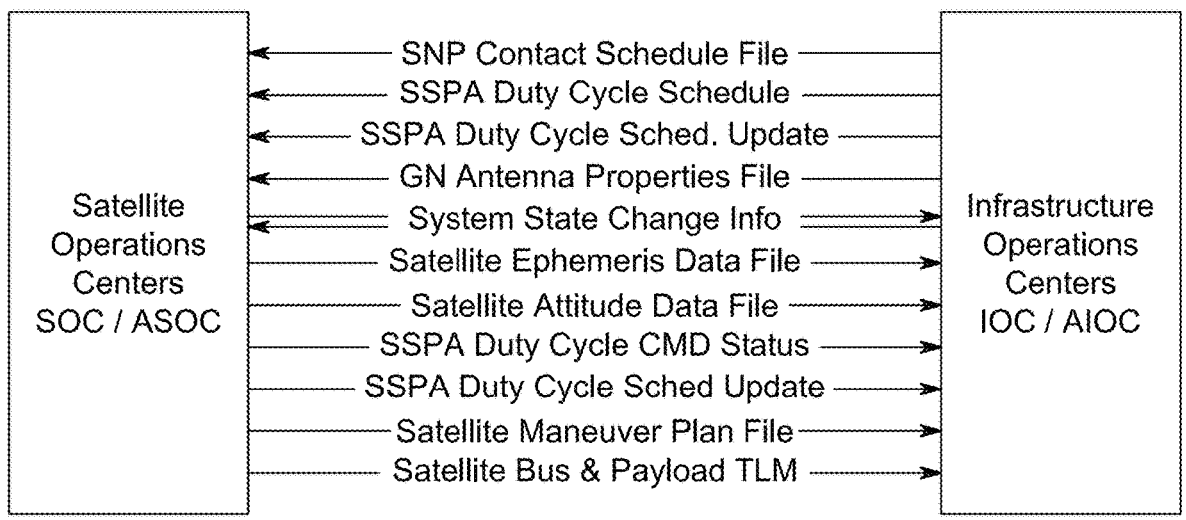
FIG. 6A depicts a SOC-to-Network operations center (NOC) Interface with the SOC of the FOGS in accordance with one or more embodiments of the present disclosure.
Figure 6B:
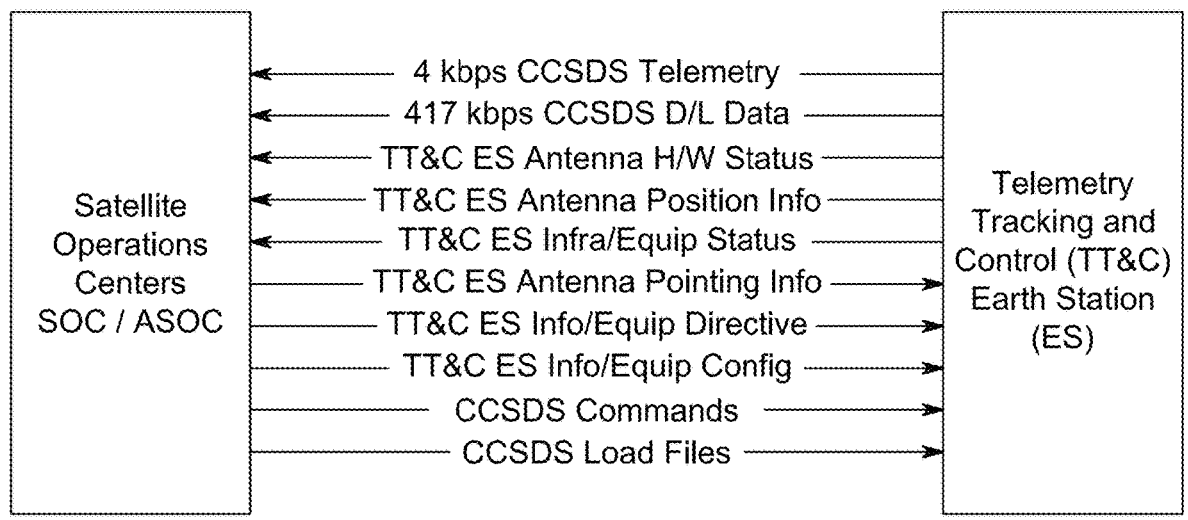
FIG. 6B depicts a TT&C Earth Station (ES) Interface with the SOC of the FOGS in accordance with one or more embodiments of the present disclosure.

Referring to FIG. 6A, a SOC-to-Network operations center (NOC) Interface with the SOC of the FOGS is depicted according to one or more embodiments of the present disclosure.

In some embodiments, Payload Command Channel (PCC) enables the SOC to command the satellites through the SAP antennas to dynamically control payload power and minimize power usage on the satellite, payload control, trajectory and/or attitude adjustment, among other satellite-related control or any combination thereof. In some embodiments, the addition of the PCC Commanding to the SOC increases complexity of the interface between the SOC and NOC. Moreover, the addition of the Payload Power Control Commanding may increase the frequency of data transferred across the interface. For example, power change requests are made periodically, such as, e.g., every 1, 2, 3, 4, 5, 10 or more minutes for each satellite, and power profile tables are requested every 6, 7, 8, 9, 10, 11, 12 or more hours for each satellite.

Accordingly, in some embodiments, the hardware and software in the SOC may be increased to support the SAP command connectivity, with Front End Processors (FEP) increased so support simultaneous commanding connections, and computer server hardware increased to support simultaneous CCE and MPE processing sessions.

In some embodiments, the PPC commanding may include, e.g., data/message types related to satellite position, messages related to schedules and commands, and/or messages related to SSPA Duty Cycle updating. For example, the messaging and/or commanding may include the SOC receiving SNP contact schedule file, SSPA duty cycle schedule, SSPA duty cycle schedule update, and GN antenna properties file, the SOC and NOC exchanging system state change information, and the SOC sending to the NOC satellite ephemeris data file, satellite attitude data file, SSPA duty cycle command status, SSPA duty cycle schedule update, satellite maneuver plan file, and satellite bus and payload telemetry.

In some embodiments, the message frequency may include any suitable frequency to enable commanding and messaging with a greatest efficiency, including, e.g., asynchronous power command requests, power command load requests several times per day (e.g., daily, twice a day, three times a day, four times a day, five times a day, six times a day, hourly, or other suitable frequency) and post-orbit determination of satellite position information.

In some embodiments, the data and/or messages may be sent over a connection suitable for the data type. For example, via a Wide Area Network (WAN) connection between SOC and NOC Referring to FIG. 6B, a TT&C Earth Station (ES) Interface with the SOC of the FOGS is depicted according to one or more embodiments of the present disclosure.

In some embodiments, an SOC interface with the TT&C EC may enable data messaging between the SOC and the TT&C EC. In some embodiments, the data/message types may include a sequence of messages of particular types, where the sequence may include messages related to Spacecraft Telemetry and Download files, Antenna Status and Position, Antenna Equipment (modems, etc. status), TT&C ES Configuration and Control Directives, TT&C ES Antenna Pointing Info, and Spacecraft Commands and Table load files, among other suitable messages and/or data types. For example, the sequence of messages may include receiving, from the TT&C EC, CCSDS telemetry, CCSDS download data, TT&C ES antenna hardware status, TT&C ES antenna position information, and TT&C ES infrastructure and equipment status, and sending, to the TT&C EC, TT&C ES antenna pointing information, TT&C ES infrastructure/equipment directive, TT&C ES infrastructure/equipment configuration, CCSDS commands, and CCSDS load files.

In some embodiments, the data and/or files retrieved from the fleet of satellites may require more bandwidth than is available for a single download. Accordingly, in some embodiments, the TT&C ES infrastructure may receive messages from the satellites via virtual channels, where each channel may enable a satellite to provide data to the TT&C ES infrastructure. In some embodiments, the satellite may send a subset of files and/or data to report particular items subject to monitoring, including particularparameters/characteristics associated with trajectory, telemetry, power control, instrument operation, etc.. In some embodiments, the TT&C ES infrastructure may instruct the satellite to send one or more additional or different subsets of data based on a change in items subject to monitoring.

In some embodiments, the message frequency may include any suitable frequency to enable accurate antenna control to communicate with satellites, such as, e.g., pre-pass, during pass, and post-pass of the satellites in the constellation.

In some embodiments, the data and/or messages may be sent over a connection suitable for the data type. For example, via a Wide Area Network (WAN) connection between SOC and TT&C ES.

Figure 7:
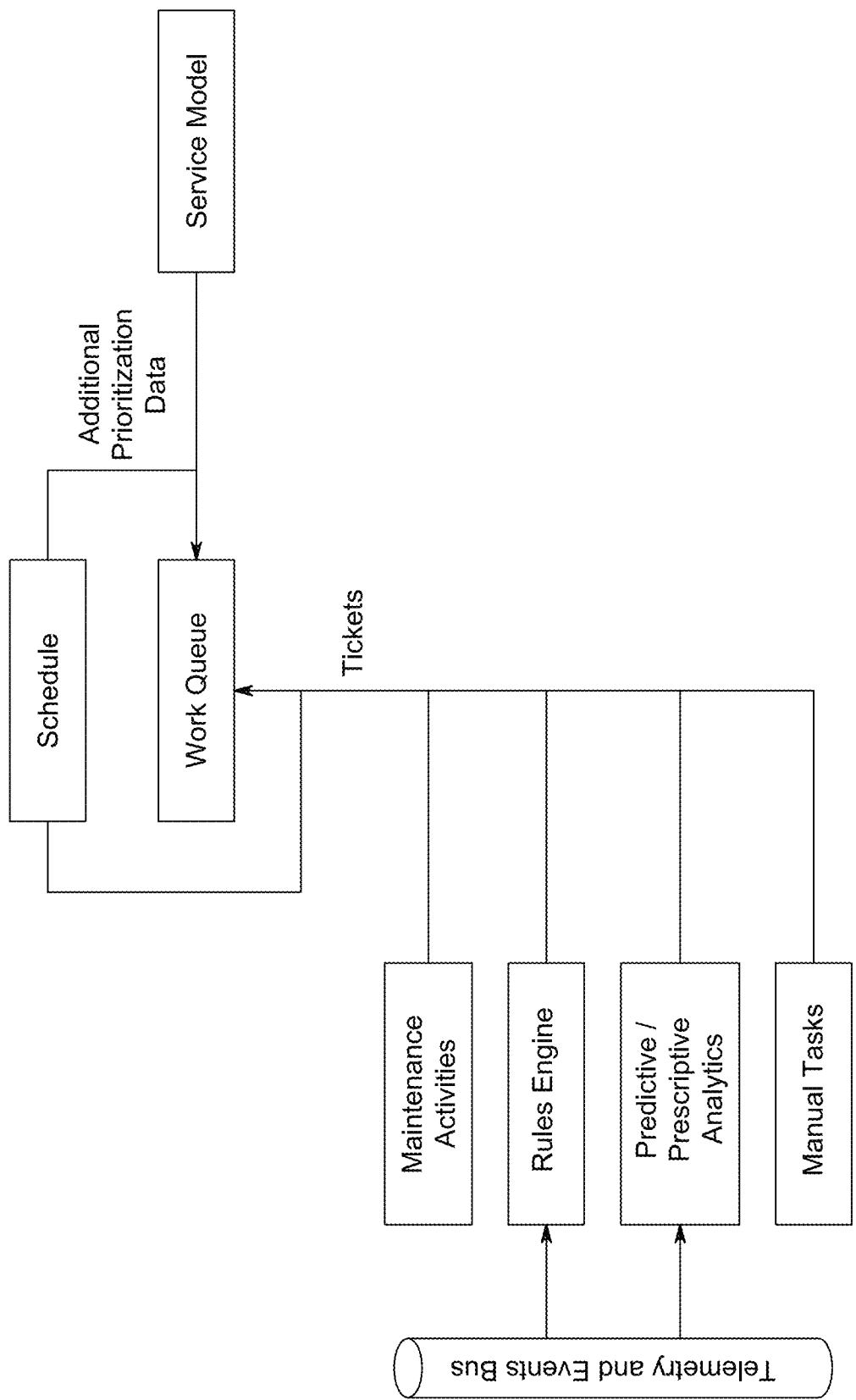
FIG. 7 depicts a data flow for automated ticket queuing in accordance with one or more embodiments of the present disclosure.

Referring to FIG. 7, a data flow for automated ticket queuing is depicted according to one or more embodiments of the present disclosure.

Typically, satellite operations assign a static satellite resource or a static group of satellite resources to a single operator. That operator is responsible for all activities for those resources including satellite commanding and satellite telemetry and state of health monitoring throughout his or her entire work shift. For example, for a satellite constellation, one operator may be assigned all activities that affect satellites in a single orbital plane. Thus, an operator is best suited for any activities for a specific satellite because he or she maintains the most recent knowledge of that satellite.

The satellite operator in a traditional operations center receives a schedule of all scheduled activities during a shift, and performs the scheduled activity for the scheduled resource at the scheduled time. If any unexpected anomalous satellite behavior is detected for a satellite, the assigned satellite operator is responsible for any commanding activities required to return the satellite to a nominal state.

If an operation is staffed to meet all possible demand, operations expense may be higher and there is a high probability that operator resources may be idle for a large proportion of their shifts (excess operator capacity). If an operation is staffed to meet the minimum level of demand, operator expenses may be lower, but there is a probability that unplanned spacecraft activities are required and that operators may not have the availability to fulfill those activities. This may be acceptable if the unplanned activity is a nominal activity, but if the activity is critical, it may impact service or lead to loss of satellite.

In some embodiments, for a large fleet of satellites, significant labor and computational resources may be needed to operate and maintain a constellation. Reducing the amount of total resources required to manage a fleet may improve the efficiency of satellite operations. Traditional satellite operations assign the responsibility of operating, monitoring, and maintaining specific satellites to specific operators for an entire work shift. However, this results in excess operator capacity when an operator's assigned satellite assets are not in contact or are quiescent, and wastes the computational resources associated with the satellite assets.

Implementing the queue work assignment model reduces the amount of unusable excess system and operator capacity because operators are assigned tasks from whichever satellite asset requires attention or action.

In some embodiments, to implement the queue work assignment, the MME may interface with the CCE, and provides a user interface for operators to receive work assignments (called tickets) in real time. The model uses a set of criteria such as severity, age, and number of concurrent issues to determine how operators are assigned tickets in order to achieve all desired business results during their work shift. The model directly improves the probability of accomplishing all required activities, the quality of operators' performance, and the number of operator resources required.

A queue driven work assignment model assigns tickets to a satellite operator using a prioritized list of activities (the work queue). Activities that require immediate attention are prioritized at the top of the work queue and assigned to the next available operator. Lower priority activities are positioned lower in the work queue and are either assigned when operators have completed their high priority activities, or are assigned lower on an operator's individual work queue. Both planned and unplanned activities are assigned through the work queue.

In some embodiments, the queue driven work assignment model may be configured for satellite operations of multiple satellite resources and takes in the unique considerations for satellite operations such as, satellite contact visibility, multiple prioritization variables, multiple issues, and other related issues.

In some embodiments, satellite contact visibility dictates when satellites can be operated on. Satellites can only be operated upon if their physical position around the earth is within line of sight of an available ground antenna, and thus able to receive communications, including, e.g., commands, payload commands, etc.

In some embodiments, multiple prioritization variables refers to multiple mission critical variables that may be used to determine prioritization of activities and assignments. Such multiple mission critical variables may include, e.g.: activity importance, spacecraft health, impact to mission service, and operator skill level. In some embodiments, spacecraft health may include onboard faults flagged by the spacecraft. In some embodiments, the onboard faults may be categorized according to predefined levels of severity. Thus, prioritization may include elevating the priority of an activity and/or assignment associated with addressing a higher level fault relative to a lower level fault of another activity and/or assignment.

In some embodiments, multiple issues may be present in a given satellite. The queue may be optimized by assigning all ongoing issues related to a single satellite to a single operator to resolve. Upon all the issues pertaining to the satellite being resolved, future issues with the satellite may be assigned to a different operator on a first-available basis or by any other suitable assignment modality.

In some embodiments, related issues to a particular operator task may be correlated to the operator task and assigned to the operator. By tracking all ongoing activities on the FOGS, the model may identify correlations between activities and events on different satellites, and alert an operator that there be some common root cause to aid troubleshooting. In some embodiments, the model may include a suitable machine learning model trained to correlate activities with root cause events. For example, an unsupervised machine learning model, such as an unsupervised nearest-neighbor algorithm or other unsupervised clustering model may be trained to group like activities together based on categorizations of root cause events identified by operators. As an operator identifies a root cause for a particular issue with a satellite, the model may automatically adjust parameters to reflect the assignment of the particular issue to the root cause.

In some embodiments, a queue work assignment model optimizes operator workload and operations expense. As the size of a satellite constellation increases, scaling up operators and the associated computing resources would be impossible, especially since satellite operations is a 24 hours by 7 days per week by 365 days per year activity, requiring a minimum of four shifts of operators. One challenge in scaling is the number of nominal activities an operator has to support. In some embodiments, satellite commanding automation as orchestrated by the MME may improve scalability by instantiating commanding software in a service-oriented architecture as detailed above. Another challenge is the variability of occurrence of unplanned activities. Unplanned activities may include satellite anomalies, payload commanding to provide service, and/or ad hoc in-orbit testing.

In some embodiments, by utilizing the MME to implement a queue driven work assignment model not only distributes the workload amongst all operators, but also enables process control metrics to evaluate whether the current staffing levels are under-utilized or over-utilized.

In some embodiments, the MME may implement the queue work assignment model using primary software components of the workflow orchestrator including, e.g.:
  a. Ticketer to create user work requests, called tickets, and stores them in a database. Tickets have metadata including priority, assignee, and workflow descriptions
  b. Dispatcher to assign tickets to different operators into queues in priority order.
  c. Operator User Interface to provide a software graphical interface that allows users to view their assigned tickets in priority order, and work tickets through the workflow.
  d. Mission Director (supervisory) User Interface to provide a software graphical interface that allows a supervisor to view ticket progress across all operators, and provide management oversight of ticket completion towards meeting goals.

In some embodiments, additionally, several other components of the MME may enable the queue work assignment model to function more effectively and efficiently:
  a. Event Adapters
  b. Event Rules Engine
  c. Activity Queue In some embodiments, the event adapters may be part of the FOGS data aggregators and provides of the MME. The event adapters may be particular interface components to gather events from different parts of the FOGS, reporting status and feed the events into a database that is monitored by the event rules engine.

In some embodiments, the event rules engine may implement rules, e.g., as configurations managed by the configuration orchestrator, that determine which events or patterns of events result in a ticket that requires operator action. This reduces the amount of raw information the operator needs to process. Operators can use rules to adjust the ratio of events to tickets to a more manageable amount. If operators are overwhelmed by the number of tickets received, they can tune the rules to generate fewer tickets. If analysis determines that additional actions need to be executed against satellites, operators can create more rules to generate tickets when instigating events occur. Tickets are linked to the events that triggered their creation, enabling operators to view situational awareness of underlying events when they view a ticket in the operator user interface.

In some embodiments, the activity queue may command satellite vehicles, but instead of requiring operators to interactively send commands during a contact with a satellite, the activity queue buffers up the commands that may be sent to the vehicle whenever the next contact begins. The activity queue enables operators that are receiving tickets to schedule an action dictated by a ticket for execution, even if the satellite is not in contact. This enables operators to spread their workload out temporally—which gives them more flexibility to do work and to prioritize activities. Otherwise, operators would be constrained to perform certain tasks only during a narrow window of time when a low earth orbit satellite is in contact.

In some embodiments, the MME of the SOC may receive satellite performance data. The satellite performance data indicating at least one characteristic of an operation of a satellite, such as, e.g., satellite telemetry and ephemeris, COLA reports, conjunction analysis, weather data, a contact schedule, satellite location, satellite contact visibility, satellite contact availability, satellite state of health, among other data or any combination thereof.

In some embodiments, the satellite performance data is received via at least one event adapter from at least one of: user error reporting, automated user device error log reports, satellite telemetry of the satellite, MPE and/or CCE and/or FDE product as detailed above, among other satellite performance data sources or any combination thereof.

Using the satellite performance data, the MME may use the anomaly service to determine an anomalous event based on the at least one characteristic of the satellite performance data, where the anomalous event indicates a type of anomaly (e.g., functional defect, performance defect, usability defect, compatibility defect, security defect, errors, among other anomaly types or any combination thereof).

In some embodiments, the anomaly service may report anomalies detected by one or more of the FOGS elements via element-specific anomaly detection protocols. In some embodiments, the anomaly service may itself detect an anomaly based on the satellite performance data. In some embodiments, to detect an anomaly, the anomaly service may utilize one or more anomaly detection models, such as an anomaly detection machine learning model that uses a layer of trainable parameters that trained using training data including satellite performance data associated with known anomalies. Alternatively, or in addition, the training data may include satellite performance data associated with known non-anomalous satellite performance. In the former arrangement, the parameters are trained to identify anomalies of the training data by updating the parameters to more closely correlate the satellite performance data to a particular anomaly. In the latter arrangement, the parameters may be trained to identify whether an anomaly is present by updating the parameters to more closely correlate satellite performance data to a non-anomalous performance (such as, e.g., for example a novelty detection model).

In some embodiments, the anomaly service may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neural network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
a. define Neural Network architecture/model,
b. transfer the input data to the exemplary neural network model,
c. train the exemplary model incrementally,
d. determine the accuracy for a specific number of timesteps,
e. apply the exemplary trained model to process the newly-received input data,
f. optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, based on any detected anomalies, the MME may generate, using, e.g., the workflow orchestrator, a work ticket based on the type of anomaly and the priority. In some embodiments, the MME may assign an operator to the ticket automatically. In some embodiments, the MME may assign the operator based on, e.g., data associated with the anomaly (e.g., an anomaly type, a satellite bus type or identify, a satellite payload configuration, etc.) and/or operator-related such as, e.g., experience as measure by tenure, experience as measure by a number of completed tickets, expertise, availability, historical turn-around time of tickets, historical performance, among other operator-related data.

In some embodiments, the workflow orchestrator may utilize logic based rules and/or machine learning modelling to determine an operator matching the anomaly. In some embodiments, the MME may utilize a first-available methodology for picking the operator from a set of qualified operators (e.g., according to tenure and/or performance and/or timeliness based on the anomaly). In some embodiments, the MME may utilize, e.g., collaborative filtering machine learning to match the operator to the anomaly, or any other suitable machine learning technique or any combination thereof.

The queue manager may be linked to operational knowledge repositories and systems, such as the external interfaces and/or internal interfaces and long-term storage, so that the operator may have relevant procedures, operational scripts, and human log entries available for reference when they execute the activity. For example the queue manager may be linked via the MM interface manager of the MME to databases of each FOGS element, to the external interfaces, and/or to the long-term flood storage.

The queue manager may accept activities into the work queue to be assigned to operators from multiple sources including:
a. Scheduled activities from the Mission Planning element in the form of an activity schedule or schedule entries sent through an application programming interface (API).
b. Unplanned activities detected by satellite automation. For example, automation may detect that a satellite is in an anomalous state, and automatically add a high priority activity to recover the satellite back into a nominal state.
c. Unplanned payload activities from the ECE that commands the payload to react to a dynamic service condition, thus improving the satellite's ability to provide service.
d. Human entered activities.
e. Periodic activities not governed by the MPE. These may include administrative and training activities. For example, the queue manager can help an operator manage their time to enter required log entries or perform training. These activities are assigned to the operator when they are not occupied by critical satellite commanding or other mission critical activities.

In some embodiments, the queue manager may use a combination of rules and software models to prioritize the assignment of activities to operators. Rules may set basic prioritization tiers. For example, critical spacecraft health and safety activities may have the highest priority, while administrative and training activities may have lower priority compared with in-orbit activities. Rules may also adjust an activity's priority based on satellite contact visibility and availability. For example, the top priority activity may be lowered in priority temporarily because the next available opportunity to communicate with the satellite may not occur for 30 minutes, while other slightly lower priority activities can be accomplished immediately.

In order to provide knowledge continuity, multiple tickets for the same satellite may be assigned to the same operator. This may prevent multiple operators from operating the same satellite, and may also ensure the operator has a broader view of a satellite's overall state of health. When a ticket is issued for a satellite, if there are no other open tickets for that satellite, the ticket is assigned according to available operator by priority. But if existing open tickets exist, the ticket may be assigned to the same operator who currently is assigned the other ticket(s) for that satellite.

The queue manager can also track operator skills, skill levels and roles. Factoring in skills and skill levels enable the queue manager to assign complex tickets to more skilled or senior operators, improving the probability of the ticket being closed successfully. Roles enable the queue manager to categorize different tickets for different users, to help close tickets more quickly, efficiently, and correctly. Activities can be decomposed and assigned to specialized operators for completion.

Activity age may also affect priority. A relatively lower priority activity may increase in priority if it continuously gets out-prioritized by other activities to the point that there is a risk that this activity may never get executed.

The queue manager may use a software model of the fleet service to help determine if certain satellites are more critical to providing business service to customers than other satellites. For example, an activity for a satellite positioned over a populated area with potential customers may rank higher in priority than a similar activity for a satellite positioned over an ocean with no customers.

If the queue manager cannot resolve a priority, it may provide the human supervisor with all the facts required to evaluate the situation and make a decision, and then to use the queue manager to assign activities to operators appropriately.

Accordingly, in some embodiments, workflow orchestrator may determine an activity priority based on, e.g., the degree of criticality, the satellite contact visibility, the satellite contact availability, work ticket age representing an amount of time since the generation of the work ticket, among other factors or any combination thereof.

In some embodiments, the workflow orchestrator may then modify a work queue associated with the operator to add the work ticket based at least in part on: the activity priority of the work ticket and at least one other priority of at least one other work ticket in the work queue, an operator skill level associated with the operator, an operator skill set associated with the operator, an operator role associated with the operator, among other ticket data or any combination thereof.

Once the ticket is added to the operator's work queue, the MM interface manager may populate the user interface at the operator's node/terminal with the ticket and associated data, e.g., via a suitable web service and/or server or other interface. In some embodiments, the operator may then interact with the user interface to make selections, input and other user interactions to define a resolution to the ticket. The resolution includes one or more instructions for modifying the operation of the satellite to correct the issue. Upon making the user interaction, the MME, via the MM interface manager, may receive satellite instructions provided by the operator to address the anomalous event.

In some embodiments, the workflow orchestrator may maintain a buffer of instructions for provision to the CCE and/or ECE. In some embodiments, the satellite instructions provided by the operator may be appended to an activity queue stored in the buffer. In some embodiments, the activity queue may be a queue of instructions that is global to the satellite constellation, or may be a satellite specific activity queue. Where the activity queue is satellite-specific, the buffer may store multiple activity queues, one for each satellites, or for each set of satellites, or a combination of satellite-specific activity queues for individual satellites and satellite set-specific activity queues for sets of satellites. Modifying an activity queue to append the satellite instruction to a buffer of instructions In some embodiments, the buffer is configured to transmit each instruction in the buffer to a respective satellite according to an order based on the activity priority, the satellite contact visibility, and the satellite contact availability.

In some embodiments, the workflow orchestrator may customize a workflow in the workflow automation database to incorporate the instructions from the operator. The workflow orchestrator may then task elements of the FOGS to perform mission planning, flight dynamics and command and control to generate satellite commands for automatically addressing the anomaly. In some embodiments, the workflow orchestrator may receive an indication from the NOC and/or FDE of a time at which the satellite will enter into a contact window in which the SNP has line-of-sight with the satellite. Based on the contact window, the workflow orchestrator may initiate the workflow and element tasking to enable the ECE to provide payload commands associated with the operator's instructions for transmission to the satellite. The payload commands may modify one or more characteristics of the operation of the satellite to mitigate the anomalous event, such as, e.g., payload power control, payload control, trajectory and/or attitude adjustment, among other characteristics or any combination thereof.

The queue model provides a means to measure operations performance, which guides operational decisions during a single shift as well as long-term staffing decision making. The system can measure how long it takes to respond to activities by type and priority, and compute the average and variance of these responses. In the short-term, this trending informs whether a supervisor needs to arrange surge support over the next several hours in anticipation of higher activity levels. In the long-term, operations management can determine acceptable thresholds of response and risk, and the metrics can drive whether more or fewer operators are required for operations.

Over time, patterns in activity can be identified and optimized, such as potentially shifting less essential planned activities to dormant periods, increasing operator utilization and reducing idle time, while resulting in fewer overall operators. These measurements may also determine procedures in operating the queue model. For example, operations management can determine the number of idle operators required in order to provide a certain level of responsiveness. This allows operations management to make organizational decisions such as cross-training staff engineers, staffing backup operation centers, hiring contract operators during certain phases, and arranging on-call surge support.

Figure 8:
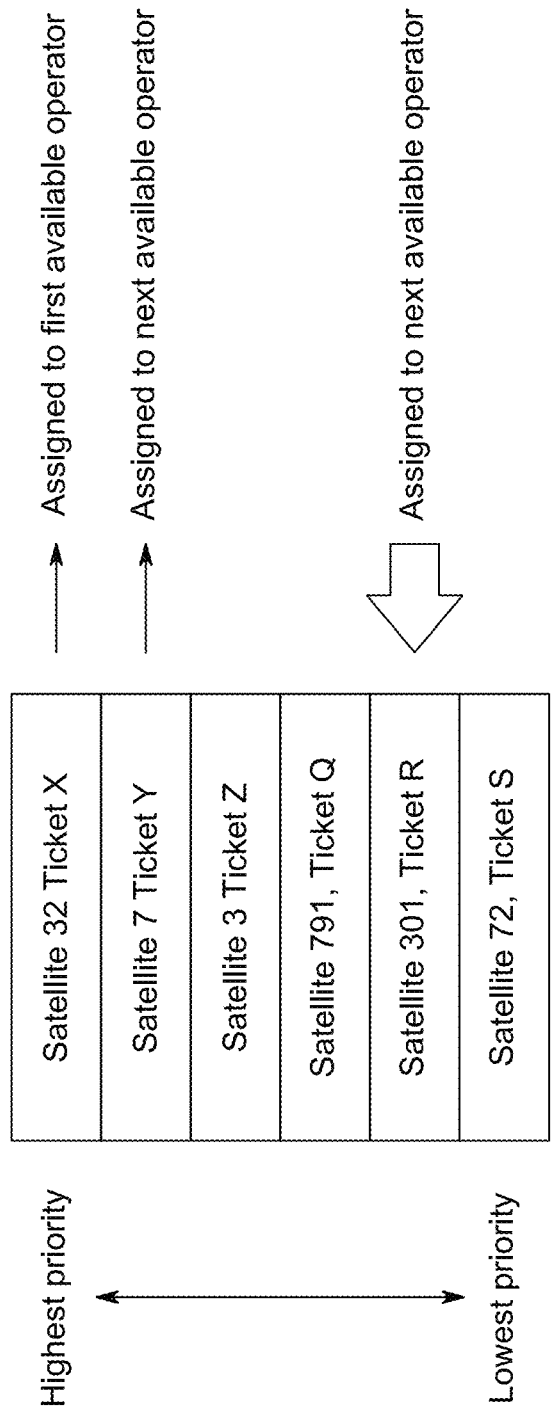
FIG. 8 depicts a prioritized queue model for distributing tickets to operators in accordance with one or more embodiments of the present disclosure.

Referring to FIG. 8, a prioritized queue model for distributing tickets to operators is depicted according to one or more embodiments of the present disclosure.

Referring to FIG. 9, an operator user interface for viewing and addressing tickets is depicted according to one or more embodiments of the present disclosure.

In some embodiments, the MM interface manager of the MME may provide a user interface (UI) to one or more operator nodes/terminals to enable operators and supervisors to view the list of prioritized work for execution and management. Operators may be able to view tickets assigned to them and also view future tickets. Operators may use the UI to change the state of the ticket to represent where it is in the ticket workflow. The operator's goal is close tickets as quickly and correctly as possible. When an activity is imminent or a new ticket is inserted, the queue manager may provide a visual notification to operators. The queue manager enables operators to accept an assigned ticket or return the ticket to the queue for assignment to another operator. Operators may also be able to take themselves out of the queue if they are on break or otherwise unavailable.

In some embodiments, the operator's UI also provides metrics to help the operator focus on prioritizing work, and grouping similar activities together.

Figure 10:
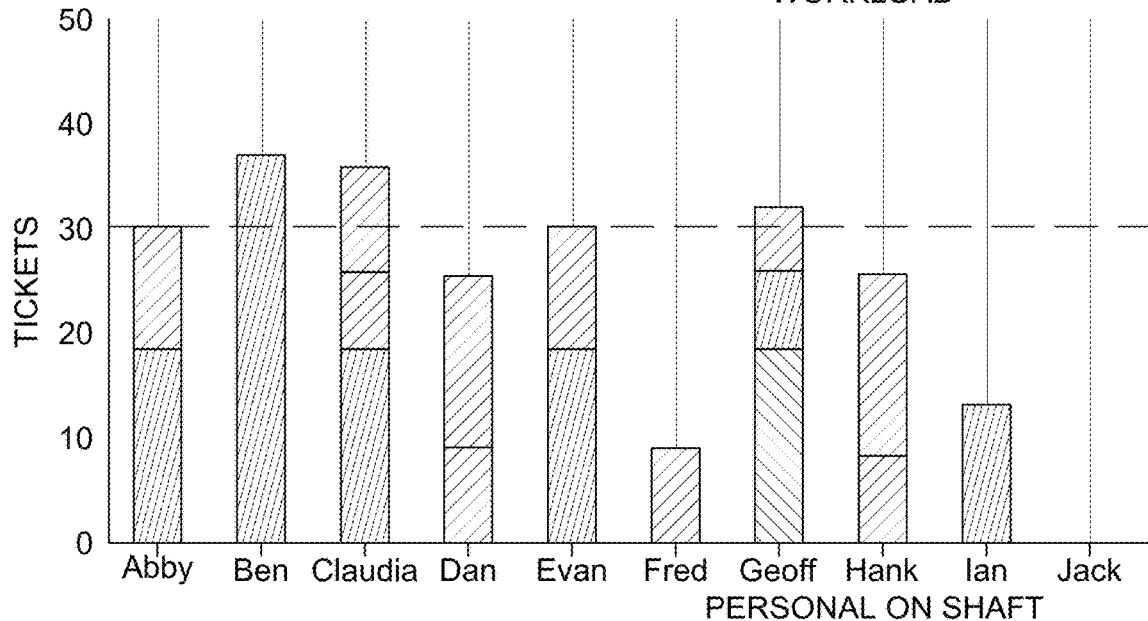
FIG. 10 depicts a data flow for automated ticket queuing in accordance with one or more embodiments of the present disclosure.
Figure 10:
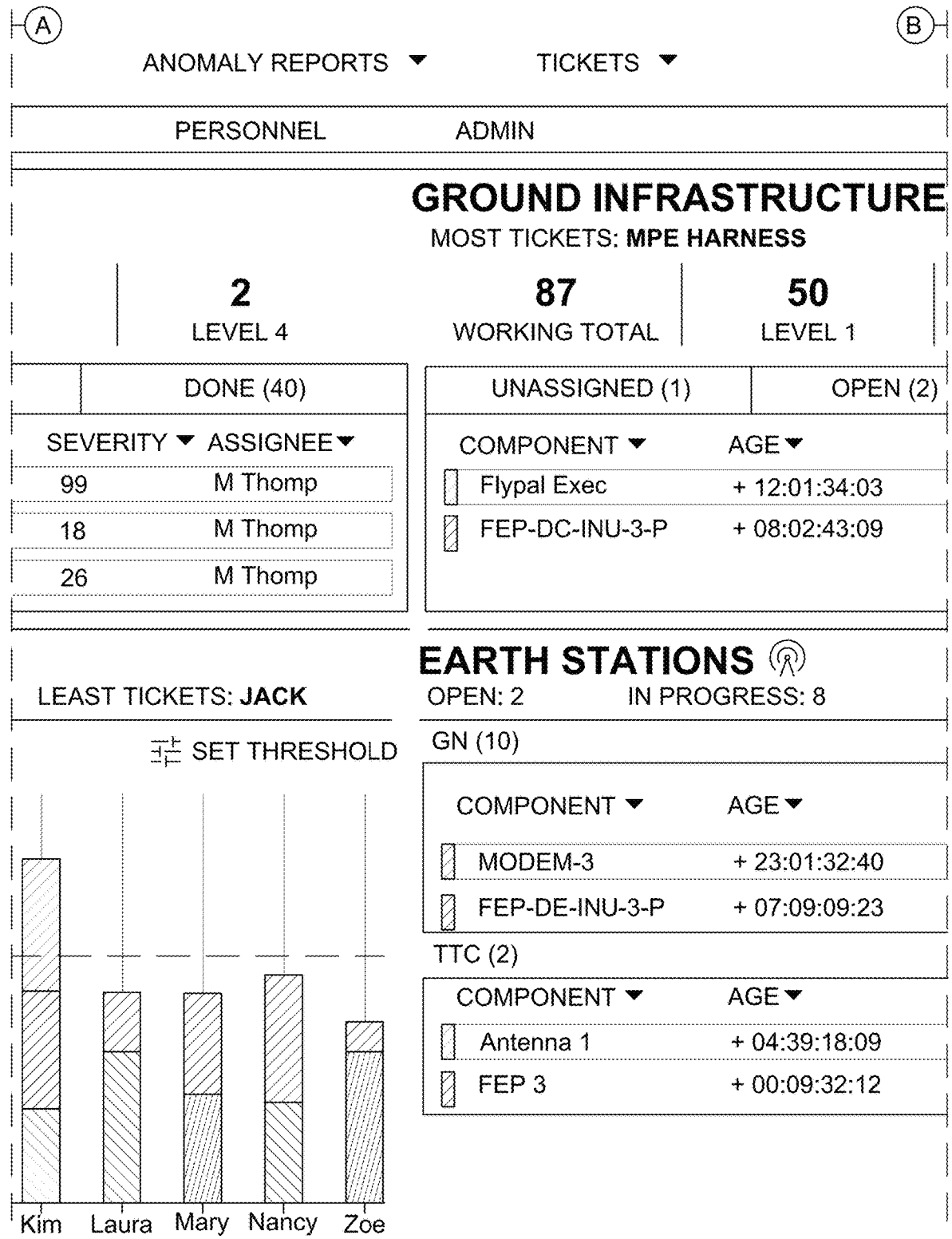

Referring to FIG. 10, a mission director (supervisory) user interface for viewing and managing tickets and data associated therewith is depicted according to one or more embodiments of the present disclosure.

In some embodiments, the Mission Directors that directly supervise on-shift operators have a different view because their primary responsibility is ensuring that tickets across the constellation are being prioritized and closed appropriately. The mission directors may be able to view the pool of available operators and what tickets each operator is currently working. The queue manager may also allow supervisors to forecast and deconflict any immediate resourcing needs over the next several hours, including assigning activities directly to specific operators. Supervisors can work with individual operators to plan specific activities and arrange for surge support if needed.

Figure 11:
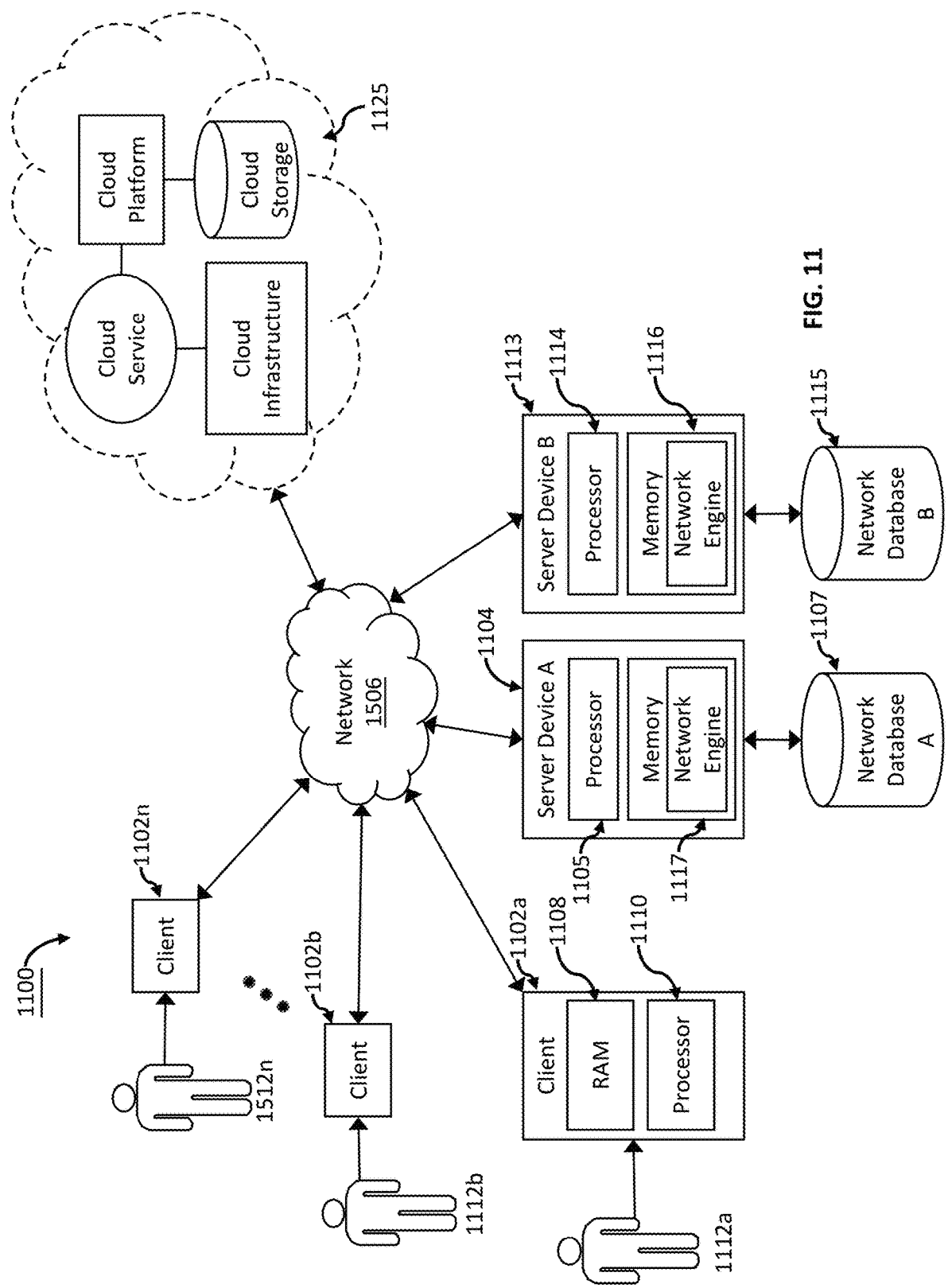
FIG. 11 depicts a block diagram of an exemplary computer-based system and platform for Fleet Operation Ground Segment in accordance with one or more embodiments of the present disclosure.

FIG. 11 depicts a block diagram of an exemplary computer-based system and platform 1100 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the client device 1102a, client device 1102b through client device 1102n shown each at least includes a computer-readable medium, such as a random-access memory (RAM) 1108 coupled to a processor 1110 or FLASH memory. In some embodiments, the processor 1110 may execute computer-executable program instructions stored in memory 1108. In some embodiments, the processor 1110 may include a microprocessor, an ASIC, and/or a state machine. In some embodiments, the processor 1110 may include, or may be in communication with, media, for example computer-readable media, which stores instructions that, when executed by the processor 1110, may cause the processor 1110 to perform one or more steps described herein. In some embodiments, examples of computer-readable media may include, but are not limited to, an electronic, optical, magnetic, or other storage or transmission device capable of providing a processor, such as the processor 1110 of client device 1102a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, client devices 1102a through 1102n may also comprise a number of external or internal devices such as a mouse, a CD-ROM, DVD, a physical or virtual keyboard, a display, or other input or output devices. In some embodiments, examples of client devices 1102a through 1102n (e.g., clients) may be any type of processor-based platforms that are connected to a network 1106 such as, without limitation, personal computers, digital assistants, personal digital assistants, smart phones, pagers, digital tablets, laptop computers, Internet appliances, and other processor-based devices. In some embodiments, client devices 1102a through 1102n may be specifically programmed with one or more application programs in accordance with one or more principles/methodologies detailed herein. In some embodiments, client devices 1102a through 1102n may operate on any operating system capable of supporting a browser or browser-enabled application, such as Microsoft™, Windows™, and/or Linux. In some embodiments, client devices 1102a through 1102n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 1102a through 1102n, user 1112a, user 1112b through user 1112n, may communicate over the exemplary network 1106 with each other and/or with other systems and/or devices coupled to the network 1106. As shown in FIG. 11, exemplary server devices 1104 and 1113 may include processor 1105 and processor 1114, respectively, as well as memory 1117 and memory 1116, respectively. In some embodiments, the server devices 1104 and 1113 may be also coupled to the network 1106. In some embodiments, one or more client devices 1102a through 1102n may be mobile clients.

In some embodiments, at least one database of exemplary databases 1107 and 1115 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 12:
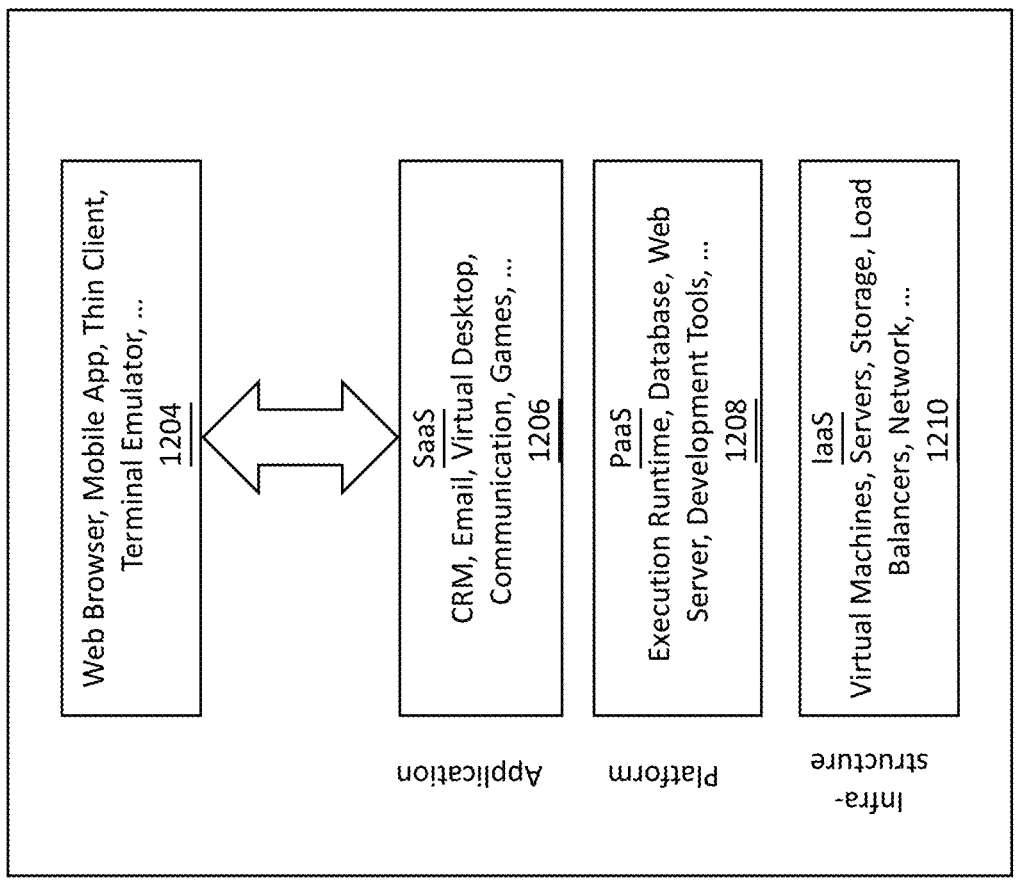
FIG. 12 depicts illustrative schematics of another exemplary implementation of the cloud computing/architecture(s) in which embodiments of a system for Fleet Operation Ground Segment may be specifically configured to operate in accordance with some embodiments of the present disclosure.

In some embodiments, the exemplary inventive computer-based systems/platforms, the exemplary inventive computer-based devices, and/or the exemplary inventive computer-based components of the present disclosure may be specifically configured to operate in a cloud computing/architecture 1125 such as, but not limiting to: infrastructure a service (IaaS) 1210, platform as a service (PaaS) 1208, and/or software as a service (SaaS) 1206 using a web browser, mobile app, thin client, terminal emulator or other endpoint 1204. FIG. 12 illustrates schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™ Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

At least some aspects of the present disclosure will now be described with reference to the following numbered clauses.

Clause 1. A method comprising: accessing, by a satellite operations center (SOC) in a fleet operations ground segment, an activity queue of a plurality of satellite activity tasks in an activity buffer of the SOC; wherein the activity queue comprises an order of issuing the satellite activity tasks; wherein each satellite activity task is associated with at least one satellite command based at least in part on: space environment context data indicative of conditions of a space environment in which a plurality of satellites in a constellation of satellites operate, and satellite telemetry data representative of satellite telemetry received from the plurality of satellites; accessing, by the SOC, satellite orbital data for the fleet of satellites; wherein the satellite orbital data comprises: a position of each satellite, and a trajectory of each satellite; determining, by the SOC, a contact window associated with each satellite of the plurality of satellites based at least in part on the satellite orbital data; wherein the at least one contact window defines at least one period of time during which each satellite of the plurality of satellites has line-of-sight with at least one satellite communication infrastructure associated with the SOC; determining, by the SOC, a plurality of mission critical variables associated with each satellite activity task of the plurality of satellite activity tasks based at least in part on the space environment context data, the satellite telemetry data, the position of each satellite, and the trajectory of each satellite; wherein the plurality of mission critical variables comprises: a state of health of each satellite, an age of each satellite activity task of the plurality of satellite activity tasks, and a service impact associated with each satellite activity task of the plurality of satellite activity tasks; determining, by the SOC for each satellite activity task, using at least one statistical model, a prioritization tier from a set of prioritization tier based at least in part on the plurality of mission critical variables associated with each satellite activity task; determining, by the SOC, a satellite activity order defining an order of plurality of satellite activity tasks based at least in part on: the contact window of each satellite, and the prioritization tier of each satellite activity task; modifying, by the SOC, the activity buffer to order the plurality of satellite activity tasks in the activity queue according to the satellite activity order.

Clause 2. The method of clause 1, further comprising: positioning, by the SOC, at least one high prioritization satellite activity task having a high prioritization tier of the set of prioritization tiers to a top position in the satellite activity order; wherein the set of prioritization tiers comprises a high prioritization tier, a standard prioritization tier and low prioritization tier; and positioning, by the SOC, at least one low prioritization satellite activity task having the low prioritization tier of the set of prioritization tiers to a bottom position in the satellite activity order.

Clause 3. The method of clause 1, wherein the plurality of satellite activity tasks comprise a plurality of satellite anomaly tickets recording a plurality of satellite anomalies to be addressed by at least one operator.

Clause 4. The method of clause 3, further comprising: instructing, upon the satellite anomaly ticket being in a first position in the ticket ordering, by the SOC, an interface management service to: access the activity buffer to obtain the satellite anomaly ticket, generate at least one user interface element with at least one content item populated by the satellite anomaly, space environment context data and satellite telemetry data of the satellite anomaly ticket, and render, on a display of a terminal associated an operator, the at least one user interface element so as to enable the operator to input user interactions to address the satellite anomaly ticket.

Clause 5. The method of clause 4, further comprising: generating, by the SOC, at least one workflow to address the satellite anomaly ticket based at least in part on the user interactions; wherein the at least one workflow comprises a series of tasks configured to trigger at least one fleet operations ground segment element of the fleet operations ground segment to generate at least one satellite command to the at least one satellite; and wherein the at least one satellite command to the at least one satellite is configured to cause at least one change in at least one of the satellite payload or the satellite bus to address the satellite anomaly.

Clause 6. The method of clause 5, further comprising: dynamically instantiating, by the SOC, at least one element-specific container to instruct the at least one fleet operations ground segment element to perform the series of tasks so as to generate at least one satellite command to the at least one satellite.

Clause 7. The method of clause 1, wherein the plurality of satellite activity tasks comprise a plurality of satellite commanding workflows comprises a series of tasks configured to trigger at least one fleet operations ground segment element of the fleet operations ground segment to generate at least one satellite command to at least one satellite of the plurality of satellites.

Clause 8. The method of clause 7, further comprising: automatically instructing, by the SOC, upon at least one contact window with the plurality of satellites commencing, the at least one satellite communication infrastructure to access each successive satellite commanding workflow in the activity queue according to the satellite activity order; and wherein each successive satellite commanding workflow is configured to cause the at least one satellite communication infrastructure to perform the series of tasks of each satellite commanding workflow so as to transmit the at least one satellite command to the at least one satellite during the at least one contact window.

Clause 9. A system comprising: a satellite operations center (SOC) in a fleet operations ground segment; wherein the SOC is configured to: access an activity queue of a plurality of satellite activity tasks in an activity buffer of the SOC; wherein the activity queue comprises an order of issuing the satellite activity tasks; wherein each satellite activity task is associated with at least one satellite command based at least in part on: space environment context data indicative of conditions of a space environment in which a plurality of satellites in a constellation of satellites operate, and satellite telemetry data representative of satellite telemetry received from the plurality of satellites; access satellite orbital data for the fleet of satellites; wherein the satellite orbital data comprises: a position of each satellite, and a trajectory of each satellite; determine a contact window associated with each satellite of the plurality of satellites based at least in part on the satellite orbital data; wherein the at least one contact window defines at least one period of time during which each satellite of the plurality of satellites has line-of-sight with at least one satellite communication infrastructure associated with the SOC; determine a plurality of mission critical variables associated with each satellite activity task of the plurality of satellite activity tasks based at least in part on the space environment context data, the satellite telemetry data, the position of each satellite, and the trajectory of each satellite; wherein the plurality of mission critical variables comprises: a state of health of each satellite, an age of each satellite activity task of the plurality of satellite activity tasks, and a service impact associated with each satellite activity task of the plurality of satellite activity tasks; determine, for each satellite activity task, using at least one statistical model, a prioritization tier from a set of prioritization tier based at least in part on the plurality of mission critical variables associated with each satellite activity task; determine a satellite activity order defining an order of plurality of satellite activity tasks based at least in part on: the contact window of each satellite, and the prioritization tier of each satellite activity task; modify the activity buffer to order the plurality of satellite activity tasks in the activity queue according to the satellite activity order.

Clause 10. The system of clause 9, wherein the SOC is further configured to: position at least one high prioritization satellite activity task having a high prioritization tier of the set of prioritization tiers to a top position in the satellite activity order; wherein the set of prioritization tiers comprises a high prioritization tier, a standard prioritization tier and low prioritization tier; and position at least one low prioritization satellite activity task having the low prioritization tier of the set of prioritization tiers to a bottom position in the satellite activity order.

Clause 11. The system of clause 9, wherein the plurality of satellite activity tasks comprise a plurality of satellite anomaly tickets recording a plurality of satellite anomalies to be addressed by at least one operator.

Clause 12. The system of clause 11, wherein the SOC is further configured to: instructing, upon the satellite anomaly ticket being in a first position in the ticket ordering, an interface management service to: access the activity buffer to obtain the satellite anomaly ticket, generate at least one user interface element with at least one content item populated by the satellite anomaly, space environment context data and satellite telemetry data of the satellite anomaly ticket, and render, on a display of a terminal associated an operator, the at least one user interface element so as to enable the operator to input user interactions to address the satellite anomaly ticket.

Clause 13. The system of clause 12, wherein the SOC is further configured to: generate at least one workflow to address the satellite anomaly ticket based at least in part on the user interactions; wherein the at least one workflow comprises a series of tasks configured to trigger at least one fleet operations ground segment element of the fleet operations ground segment to generate at least one satellite command to the at least one satellite; and wherein the at least one satellite command to the at least one satellite is configured to cause at least one change in at least one of the satellite payload or the satellite bus to address the satellite anomaly.

Clause 14. The system of clause 13, wherein the SOC is further configured to: dynamically instantiate at least one element-specific container to instruct the at least one fleet operations ground segment element to perform the series of tasks so as to generate at least one satellite command to the at least one satellite.

Clause 15. The system of clause 9, wherein the plurality of satellite activity tasks comprise a plurality of satellite commanding workflows comprises a series of tasks configured to trigger at least one fleet operations ground segment element of the fleet operations ground segment to generate at least one satellite command to at least one satellite of the plurality of satellites.

Clause 16. The system of clause 15, wherein the SOC is further configured to: automatically instruct upon at least one contact window with the plurality of satellites commencing, the at least one satellite communication infrastructure to access each successive satellite commanding workflow in the activity queue according to the satellite activity order; and wherein each successive satellite commanding workflow is configured to cause the at least one satellite communication infrastructure to perform the series of tasks of each satellite commanding workflow so as to transmit the at least one satellite command to the at least one satellite during the at least one contact window.

Clause 17. A non-transitory computer readable medium having software instructions stored thereon, the software instructions, upon execution, being configured to cause a satellite operations center (SOC) in a fleet operations ground segment to perform steps comprising: accessing an activity queue of a plurality of satellite activity tasks in an activity buffer of the SOC; wherein the activity queue comprises an order of issuing the satellite activity tasks; wherein each satellite activity task is associated with at least one satellite command based at least in part on: space environment context data indicative of conditions of a space environment in which a plurality of satellites in a constellation of satellites operate, and satellite telemetry data representative of satellite telemetry received from the plurality of satellites; accessing satellite orbital data for the fleet of satellites; wherein the satellite orbital data comprises: a position of each satellite, and a trajectory of each satellite; determining a contact window associated with each satellite of the plurality of satellites based at least in part on the satellite orbital data; wherein the at least one contact window defines at least one period of time during which each satellite of the plurality of satellites has line-of-sight with at least one satellite communication infrastructure associated with the SOC; determining a plurality of mission critical variables associated with each satellite activity task of the plurality of satellite activity tasks based at least in part on the space environment context data, the satellite telemetry data, the position of each satellite, and the trajectory of each satellite; wherein the plurality of mission critical variables comprises: a state of health of each satellite, an age of each satellite activity task of the plurality of satellite activity tasks, and a service impact associated with each satellite activity task of the plurality of satellite activity tasks; determining, for each satellite activity task, using at least one statistical model, a prioritization tier from a set of prioritization tier based at least in part on the plurality of mission critical variables associated with each satellite activity task; determining a satellite activity order defining an order of plurality of satellite activity tasks based at least in part on: the contact window of each satellite, and the prioritization tier of each satellite activity task; modifying the activity buffer to order the plurality of satellite activity tasks in the activity queue according to the satellite activity order.

Clause 18. The non-transitory computer readable medium of clause 17, wherein the software instructions are further configured to cause the SOC to perform further steps comprising: positioning at least one high prioritization satellite activity task having a high prioritization tier of the set of prioritization tiers to a top position in the satellite activity order; wherein the set of prioritization tiers comprises a high prioritization tier, a standard prioritization tier and low prioritization tier; and positioning at least one low prioritization satellite activity task having the low prioritization tier of the set of prioritization tiers to a bottom position in the satellite activity order.

Clause 19. The system of clause 17, wherein the plurality of satellite activity tasks comprise a plurality of satellite anomaly tickets recording a plurality of satellite anomalies to be addressed by at least one operator.

Clause 20. The system of clause 17, wherein the plurality of satellite activity tasks comprise a plurality of satellite commanding workflows comprises a series of tasks configured to trigger at least one fleet operations ground segment element of the fleet operations ground segment to generate at least one satellite command to at least one satellite of the plurality of satellites.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

The invention claimed is:

1. A method comprising:
accessing, by a satellite operations center (SOC) in a fleet operations ground segment, an activity queue of a plurality of satellite activity tasks in an activity buffer of the SOC;
  wherein the activity queue comprises an order of issuing the satellite activity tasks;
  wherein each satellite activity task is associated with at least one satellite command based at least in part on:
    space environment context data indicative of conditions of a space environment in which a plurality of satellites in a constellation of satellites operate, and
    satellite telemetry data representative of satellite telemetry received from the plurality of satellites;
accessing, by the SOC, satellite orbital data for the fleet of satellites;
  wherein the satellite orbital data comprises:
    a position of each satellite, and
    a trajectory of each satellite;
determining, by the SOC, a contact window associated with each satellite of the plurality of satellites based at least in part on the satellite orbital data;
  wherein the at least one contact window defines at least one period of time during which each satellite of the plurality of satellites has line-of-sight with at least one satellite communication infrastructure associated with the SOC;
determining, by the SOC, a plurality of mission critical variables associated with each satellite activity task of the plurality of satellite activity tasks based at least in part on the space environment context data, the satellite telemetry data, the position of each satellite, and the trajectory of each satellite;
  wherein the plurality of mission critical variables comprises:
    a state of health of each satellite,
    an age of each satellite activity task of the plurality of satellite activity tasks, and
    a service impact associated with each satellite activity task of the plurality of satellite activity tasks;
determining, by the SOC for each satellite activity task, using at least one statistical model, a prioritization tier from a set of prioritization tier based at least in part on the plurality of mission critical variables associated with each satellite activity task;
determining, by the SOC, a satellite activity order defining an order of plurality of satellite activity tasks based at least in part on:
  the contact window of each satellite, and
  the prioritization tier of each satellite activity task;
modifying, by the SOC, the activity buffer to order the plurality of satellite activity tasks in the activity queue according to the satellite activity order.

2. The method of claim 1, further comprising:
positioning, by the SOC, at least one high prioritization satellite activity task having a high prioritization tier of the set of prioritization tiers to a top position in the satellite activity order;
  wherein the set of prioritization tiers comprises a high prioritization tier, a standard prioritization tier and low prioritization tier; and
positioning, by the SOC, at least one low prioritization satellite activity task having the low prioritization tier of the set of prioritization tiers to a bottom position in the satellite activity order.

3. The method of claim 1, wherein the plurality of satellite activity tasks comprise a plurality of satellite anomaly tickets recording a plurality of satellite anomalies to be addressed by at least one operator.

4. The method of claim 3, further comprising:
instructing, upon the satellite anomaly ticket being in a first position in the ticket ordering, by the SOC, an interface management service to:
access the activity buffer to obtain the satellite anomaly ticket,
generate at least one user interface element with at least one content item populated by the satellite anomaly, space environment context data and satellite telemetry data of the satellite anomaly ticket, and
render, on a display of a terminal associated an operator, the at least one user interface element so as to enable the operator to input user interactions to address the satellite anomaly ticket.

5. The method of claim 4, further comprising:
generating, by the SOC, at least one workflow to address the satellite anomaly ticket based at least in part on the user interactions;
  wherein the at least one workflow comprises a series of tasks configured to trigger at least one fleet operations ground segment element of the fleet operations ground segment to generate at least one satellite command to the at least one satellite; and
  wherein the at least one satellite command to the at least one satellite is configured to cause at least one change in at least one of the satellite payload or the satellite bus to address the satellite anomaly.

6. The method of claim 5, further comprising:
dynamically instantiating, by the SOC, at least one element-specific container to instruct the at least one fleet operations ground segment element to perform the series of tasks so as to generate at least one satellite command to the at least one satellite.

7. The method of claim 1, wherein the plurality of satellite activity tasks comprise a plurality of satellite commanding workflows comprises a series of tasks configured to trigger at least one fleet operations ground segment element of the fleet operations ground segment to generate at least one satellite command to at least one satellite of the plurality of satellites.

8. The method of claim 7, further comprising:
automatically instructing, by the SOC, upon at least one contact window with the plurality of satellites commencing, the at least one satellite communication infrastructure to access each successive satellite commanding workflow in the activity queue according to the satellite activity order; and
  wherein each successive satellite commanding workflow is configured to cause the at least one satellite communication infrastructure to perform the series of tasks of each satellite commanding workflow so as to transmit the at least one satellite command to the at least one satellite during the at least one contact window.

9. A system comprising:
a satellite operations center (SOC) in a fleet operations ground segment;
  wherein the SOC is configured to:
    access an activity queue of a plurality of satellite activity tasks in an activity buffer of the SOC;
      wherein the activity queue comprises an order of issuing the satellite activity tasks;

wherein each satellite activity task is associated with at least one satellite command based at least in part on:
space environment context data indicative of conditions of a space environment in which a plurality of satellites in a constellation of satellites operate, and
satellite telemetry data representative of satellite telemetry received from the plurality of satellites;
access satellite orbital data for the fleet of satellites;
wherein the satellite orbital data comprises:
a position of each satellite, and
a trajectory of each satellite;
determine a contact window associated with each satellite of the plurality of satellites based at least in part on the satellite orbital data;
wherein the at least one contact window defines at least one period of time during which each satellite of the plurality of satellites has line-of-sight with at least one satellite communication infrastructure associated with the SOC;
determine a plurality of mission critical variables associated with each satellite activity task of the plurality of satellite activity tasks based at least in part on the space environment context data, the satellite telemetry data, the position of each satellite, and the trajectory of each satellite;
wherein the plurality of mission critical variables comprises:
a state of health of each satellite,
an age of each satellite activity task of the plurality of satellite activity tasks, and
a service impact associated with each satellite activity task of the plurality of satellite activity tasks;
determine, for each satellite activity task, using at least one statistical model, a prioritization tier from a set of prioritization tier based at least in part on the plurality of mission critical variables associated with each satellite activity task;
determine a satellite activity order defining an order of plurality of satellite activity tasks based at least in part on:
the contact window of each satellite, and
the prioritization tier of each satellite activity task;
modify the activity buffer to order the plurality of satellite activity tasks in the activity queue according to the satellite activity order.

10. The system of claim 9, wherein the SOC is further configured to:
position at least one high prioritization satellite activity task having a high prioritization tier of the set of prioritization tiers to a top position in the satellite activity order;
wherein the set of prioritization tiers comprises a high prioritization tier, a standard prioritization tier and low prioritization tier; and
position at least one low prioritization satellite activity task having the low prioritization tier of the set of prioritization tiers to a bottom position in the satellite activity order.

11. The system of claim 9, wherein the plurality of satellite activity tasks comprise a plurality of satellite anomaly tickets recording a plurality of satellite anomalies to be addressed by at least one operator.

12. The system of claim 11, wherein the SOC is further configured to:
instructing, upon the satellite anomaly ticket being in a first position in the ticket ordering, an interface management service to:
access the activity buffer to obtain the satellite anomaly ticket,
generate at least one user interface element with at least one content item populated by the satellite anomaly, space environment context data and satellite telemetry data of the satellite anomaly ticket, and
render, on a display of a terminal associated an operator, the at least one user interface element so as to enable the operator to input user interactions to address the satellite anomaly ticket.

13. The system of claim 12, wherein the SOC is further configured to:
generate at least one workflow to address the satellite anomaly ticket based at least in part on the user interactions;
wherein the at least one workflow comprises a series of tasks configured to trigger at least one fleet operations ground segment element of the fleet operations ground segment to generate at least one satellite command to the at least one satellite; and
wherein the at least one satellite command to the at least one satellite is configured to cause at least one change in at least one of the satellite payload or the satellite bus to address the satellite anomaly.

14. The system of claim 13, wherein the SOC is further configured to:
dynamically instantiate at least one element-specific container to instruct the at least one fleet operations ground segment element to perform the series of tasks so as to generate at least one satellite command to the at least one satellite.

15. The system of claim 9, wherein the plurality of satellite activity tasks comprise a plurality of satellite commanding workflows comprises a series of tasks configured to trigger at least one fleet operations ground segment element of the fleet operations ground segment to generate at least one satellite command to at least one satellite of the plurality of satellites.

16. The system of claim 15, wherein the SOC is further configured to:
automatically instruct upon at least one contact window with the plurality of satellites commencing, the at least one satellite communication infrastructure to access each successive satellite commanding workflow in the activity queue according to the satellite activity order; and
wherein each successive satellite commanding workflow is configured to cause the at least one satellite communication infrastructure to perform the series of tasks of each satellite commanding workflow so as to transmit the at least one satellite command to the at least one satellite during the at least one contact window.

17. A non-transitory computer readable medium having software instructions stored thereon, the software instructions, upon execution, being configured to cause a satellite operations center (SOC) in a fleet operations ground segment to perform steps comprising:
accessing an activity queue of a plurality of satellite activity tasks in an activity buffer of the SOC;
wherein the activity queue comprises an order of issuing the satellite activity tasks;

wherein each satellite activity task is associated with at least one satellite command based at least in part on:
- space environment context data indicative of conditions of a space environment in which a plurality of satellites in a constellation of satellites operate, and
- satellite telemetry data representative of satellite telemetry received from the plurality of satellites;

accessing satellite orbital data for the fleet of satellites;
wherein the satellite orbital data comprises:
- a position of each satellite, and
- a trajectory of each satellite;

determining a contact window associated with each satellite of the plurality of satellites based at least in part on the satellite orbital data;
wherein the at least one contact window defines at least one period of time during which each satellite of the plurality of satellites has line-of-sight with at least one satellite communication infrastructure associated with the SOC;

determining a plurality of mission critical variables associated with each satellite activity task of the plurality of satellite activity tasks based at least in part on the space environment context data, the satellite telemetry data, the position of each satellite, and the trajectory of each satellite;
wherein the plurality of mission critical variables comprises:
- a state of health of each satellite,
- an age of each satellite activity task of the plurality of satellite activity tasks, and
- a service impact associated with each satellite activity task of the plurality of satellite activity tasks;

determining, for each satellite activity task, using at least one statistical model, a prioritization tier from a set of prioritization tier based at least in part on the plurality of mission critical variables associated with each satellite activity task;

determining a satellite activity order defining an order of plurality of satellite activity tasks based at least in part on:
- the contact window of each satellite, and
- the prioritization tier of each satellite activity task;

modifying the activity buffer to order the plurality of satellite activity tasks in the activity queue according to the satellite activity order.

18. The non-transitory computer readable medium of claim 17, wherein the software instructions are further configured to cause the SOC to perform further steps comprising:

positioning at least one high prioritization satellite activity task having a high prioritization tier of the set of prioritization tiers to a top position in the satellite activity order;
wherein the set of prioritization tiers comprises a high prioritization tier, a standard prioritization tier and low prioritization tier; and positioning at least one low prioritization satellite activity task having the low prioritization tier of the set of prioritization tiers to a bottom position in the satellite activity order.

19. The system of claim 17, wherein the plurality of satellite activity tasks comprise a plurality of satellite anomaly tickets recording a plurality of satellite anomalies to be addressed by at least one operator.

20. The system of claim 17, wherein the plurality of satellite activity tasks comprise a plurality of satellite commanding workflows comprises a series of tasks configured to trigger at least one fleet operations ground segment element of the fleet operations ground segment to generate at least one satellite command to at least one satellite of the plurality of satellites.

* * * * *